(12) United States Patent
Baljozovic et al.

(10) Patent No.: US 11,353,092 B2
(45) Date of Patent: Jun. 7, 2022

(54) TIMING BELT TENSIONER WITH IMPROVED CONSTRUCTION

(71) Applicant: LITENS AUTOMOTIVE PARTNERSHIP, Woodbridge (CA)

(72) Inventors: Milos Baljozovic, Toronto (CA); Rares I. Comsa, Newmarket (CA); Flaviu V. Dinca, Richmond Hill (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 203 days.

(21) Appl. No.: 16/605,971

(22) PCT Filed: May 1, 2018

(86) PCT No.: PCT/CA2018/050508
§ 371 (c)(1),
(2) Date: Oct. 17, 2019

(87) PCT Pub. No.: WO2018/195673
PCT Pub. Date: Nov. 1, 2018

(65) Prior Publication Data
US 2021/0140518 A1 May 13, 2021

Related U.S. Application Data

(60) Provisional application No. 62/568,097, filed on Oct. 4, 2017, provisional application No. 62/491,469, filed on Apr. 28, 2017.

(51) Int. Cl.
*F16H 7/12* (2006.01)
*F01L 1/02* (2006.01)
*F16H 7/08* (2006.01)

(52) U.S. Cl.
CPC ............ *F16H 7/1218* (2013.01); *F01L 1/024* (2013.01); *F16H 7/0831* (2013.01);
(Continued)

(58) Field of Classification Search
CPC ............ F16H 2007/081; F16H 7/1281; F16H 7/1218; F16H 2007/0846; F16H 2007/0893
(Continued)

(56) References Cited

U.S. PATENT DOCUMENTS

| 4,917,655 A * | 4/1990 | Martin | F16H 7/1218 |
| | | | 474/112 |
| 4,934,987 A * | 6/1990 | Kadota | F16H 7/1227 |
| | | | 474/112 |

(Continued)

FOREIGN PATENT DOCUMENTS

| EP | 2230422 A1 | 9/2010 |
| EP | 2909507 A1 | 8/2015 |

(Continued)

OTHER PUBLICATIONS

European Search Report dated Nov. 30, 2020.
International Search Report and Written Opinion for PCT/CA2018/050508 dated Jul. 13, 2018.

*Primary Examiner* — Henry Y Liu
(74) *Attorney, Agent, or Firm* — Millman IP Inc.

(57) ABSTRACT

In an aspect, a tensioner is provided for an endless drive member, and includes a shaft-and-base unit, a tensioner arm, a pulley, and a tensioner spring. The shaft-and-base unit is mountable to be stationary relative to an engine, and includes a fastener aperture for a fastener. The tensioner arm is pivotable relative to the shaft-and-base unit about a tensioner arm axis. The pulley is rotatably mounted to the tensioner arm for rotation and is engageable with an endless drive member. The tensioner spring is positioned to urge the tensioner arm in a first direction relative to the shaft-and-base unit. The tensioner spring includes a plurality of coils that are arranged generally helically about a longitudinal axis and are spaced radially from one another and generally (Continued)

increase in distance away from the axis in a longitudinal direction.

18 Claims, 14 Drawing Sheets

(52) U.S. Cl.
CPC ............... *F16H 2007/081* (2013.01); *F16H 2007/0844* (2013.01); *F16H 2007/0846* (2013.01); *F16H 2007/0865* (2013.01); *F16H 2007/0893* (2013.01); *F16H 2007/0897* (2013.01)

(58) Field of Classification Search
USPC .................................................. 474/112, 135
See application file for complete search history.

(56) References Cited

U.S. PATENT DOCUMENTS

| | | | | |
|---|---|---|---|---|
| 5,244,438 A * | 9/1993 | Golovatai-Schmidt | ..................... | F16H 7/1281 474/112 |
| 5,443,424 A * | 8/1995 | Henderson | ............ | F16H 7/1218 474/135 |
| 5,462,494 A * | 10/1995 | Rogalla | ................. | F16H 7/1218 474/135 |
| 5,620,385 A * | 4/1997 | Cascionale | ............ | F16H 7/1218 474/112 |
| 5,919,107 A * | 7/1999 | Stepniak | ................ | F16H 7/1281 474/112 |
| 5,993,340 A * | 11/1999 | Rocca | ....................... | F16F 7/06 474/109 |
| 6,206,797 B1 * | 3/2001 | Quintus | ................. | F16H 7/1218 474/101 |
| 6,375,588 B1 * | 4/2002 | Frankowski | ........... | F16H 7/1227 474/101 |
| 7,637,829 B2 * | 12/2009 | Stone | ..................... | F16H 7/1281 474/109 |
| 7,850,560 B2 * | 12/2010 | Arneth | ................... | F16H 7/1281 474/112 |
| 7,874,950 B2 * | 1/2011 | Lehtovaara | ........... | F16H 7/1281 474/135 |
| 7,980,976 B2 * | 7/2011 | Stepniak | ................ | F16H 7/1281 474/112 |
| 8,292,765 B2 * | 10/2012 | Rolando | ............... | F16H 7/1281 474/112 |
| 8,641,564 B2 * | 2/2014 | Rolando | ............... | F16H 7/1281 474/112 |
| 8,734,279 B2 * | 5/2014 | Ward | .................... | F16H 7/1218 474/112 |
| 9,829,081 B2 * | 11/2017 | Jiang | ..................... | F16H 7/1218 |
| 2003/0017894 A1 * | 1/2003 | Kaiser | .................. | F16H 7/1218 474/112 |
| 2003/0119615 A1 * | 6/2003 | Meckstroth | ........... | F16H 7/1218 474/135 |
| 2004/0063531 A1 * | 4/2004 | Cura | ..................... | F16H 7/1281 474/135 |
| 2004/0180745 A1 * | 9/2004 | Dinca | .................. | F16H 7/1281 474/135 |
| 2008/0113835 A1 * | 5/2008 | Baumuller | ............ | F16H 7/1218 474/112 |
| 2008/0153642 A1 * | 6/2008 | Baumuller | ............ | F16H 7/1281 474/101 |
| 2008/0153644 A1 * | 6/2008 | Arneth | .................. | F16H 7/1281 474/135 |
| 2008/0176687 A1 * | 7/2008 | Schever | ................ | F16H 7/1281 474/135 |
| 2009/0011881 A1 * | 1/2009 | Lehtovaara | ........... | F16H 7/1281 474/135 |
| 2010/0069185 A1 * | 3/2010 | Ward | .................... | F16H 7/1218 474/117 |
| 2010/0144473 A1 * | 6/2010 | Ward | .................... | F16H 7/1281 474/112 |
| 2010/0190594 A1 * | 7/2010 | Rolando | ............... | F16H 7/1218 474/112 |
| 2010/0190595 A1 * | 7/2010 | Baumuller | ............ | F16H 7/1281 474/112 |
| 2011/0045929 A1 * | 2/2011 | Rolando | ............... | F16H 7/1218 474/112 |
| 2012/0316019 A1 * | 12/2012 | Ward | .................... | F16H 7/1218 474/135 |
| 2013/0165284 A1 * | 6/2013 | Mennerat | .................. | F16H 7/12 474/112 |
| 2014/0113755 A1 * | 4/2014 | Ward | .................... | F16H 7/1281 474/112 |
| 2016/0017963 A1 * | 1/2016 | Albrecht | ................ | F16H 7/10 474/112 |
| 2016/0377152 A1 * | 12/2016 | Albrecht | ............... | F16H 7/1281 474/112 |
| 2017/0219068 A1 * | 8/2017 | Tronquoy | ............. | F16H 7/1281 |

FOREIGN PATENT DOCUMENTS

| | | |
|---|---|---|
| WO | 2003036130 A1 | 5/2003 |
| WO | 2004057212 A1 | 7/2004 |
| WO | 2006137086 A1 | 12/2006 |

* cited by examiner

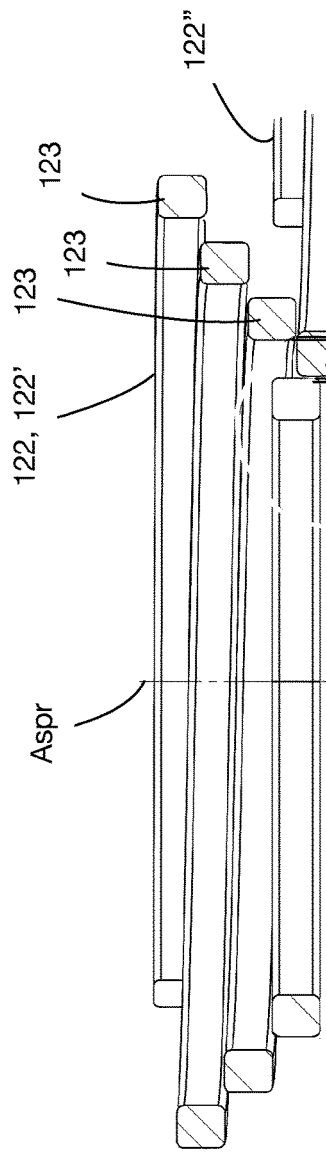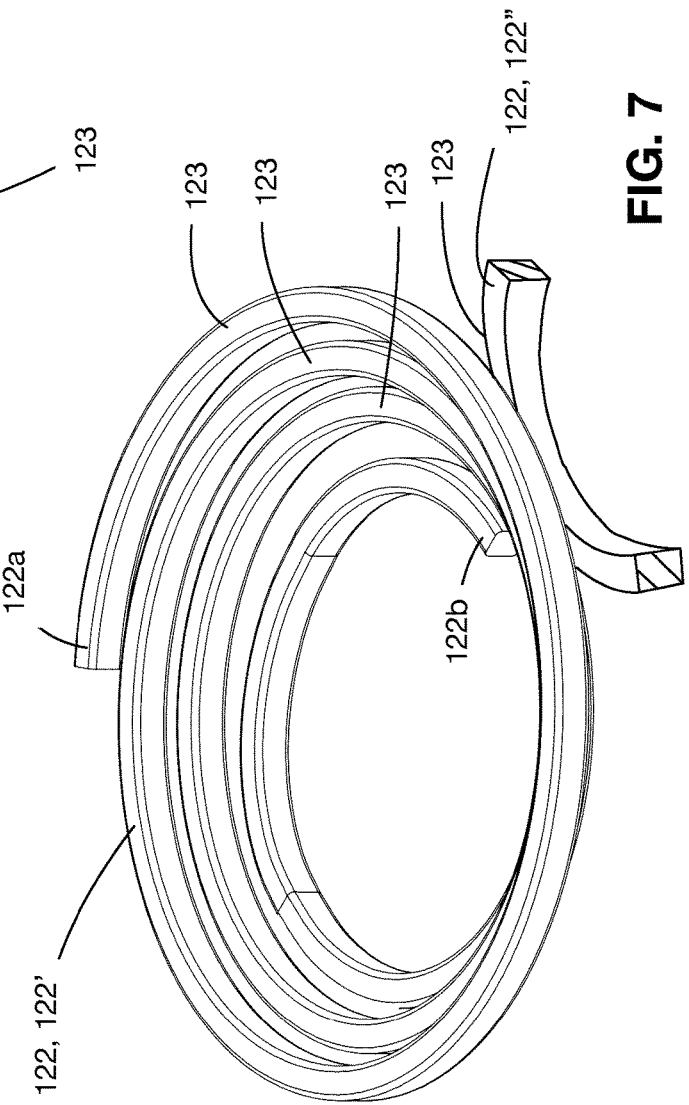

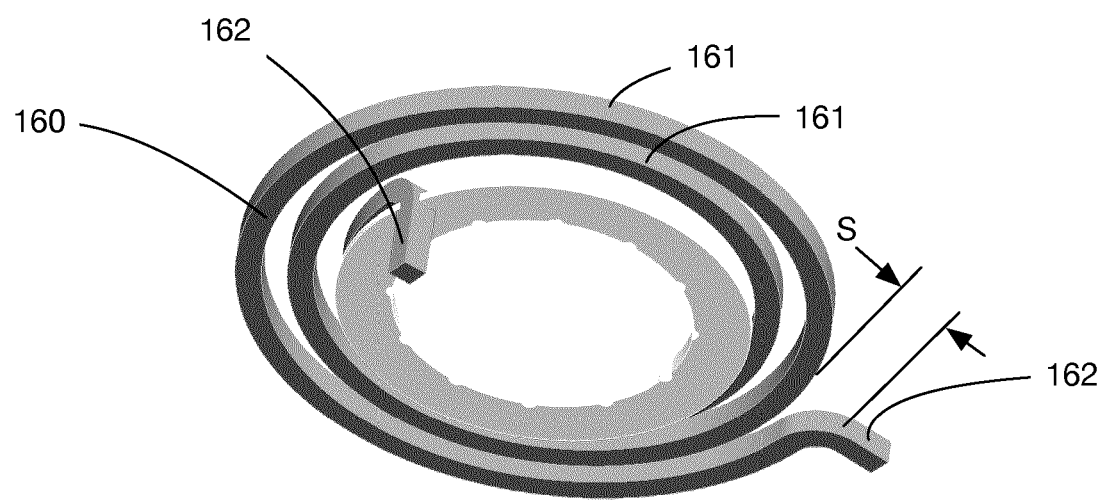
FIG. 8
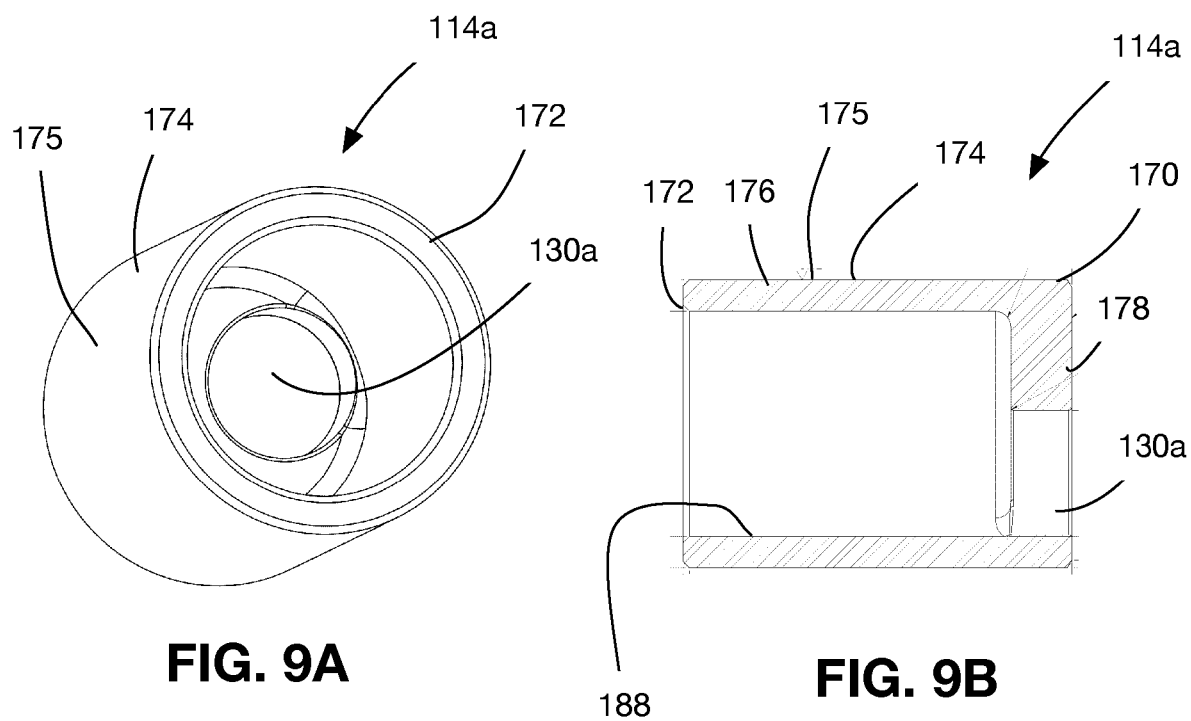
FIG. 9A
FIG. 9B

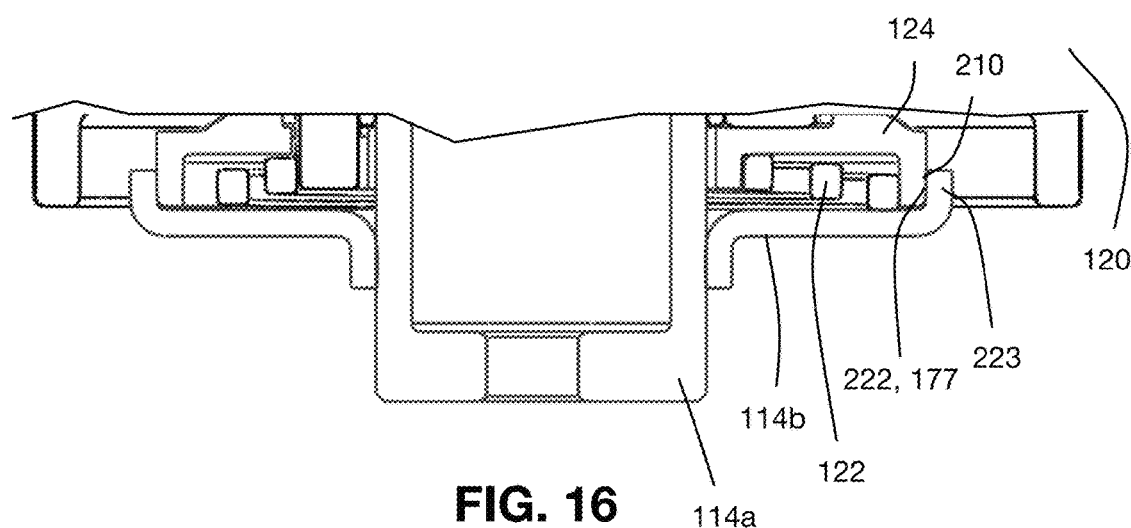
FIG. 16
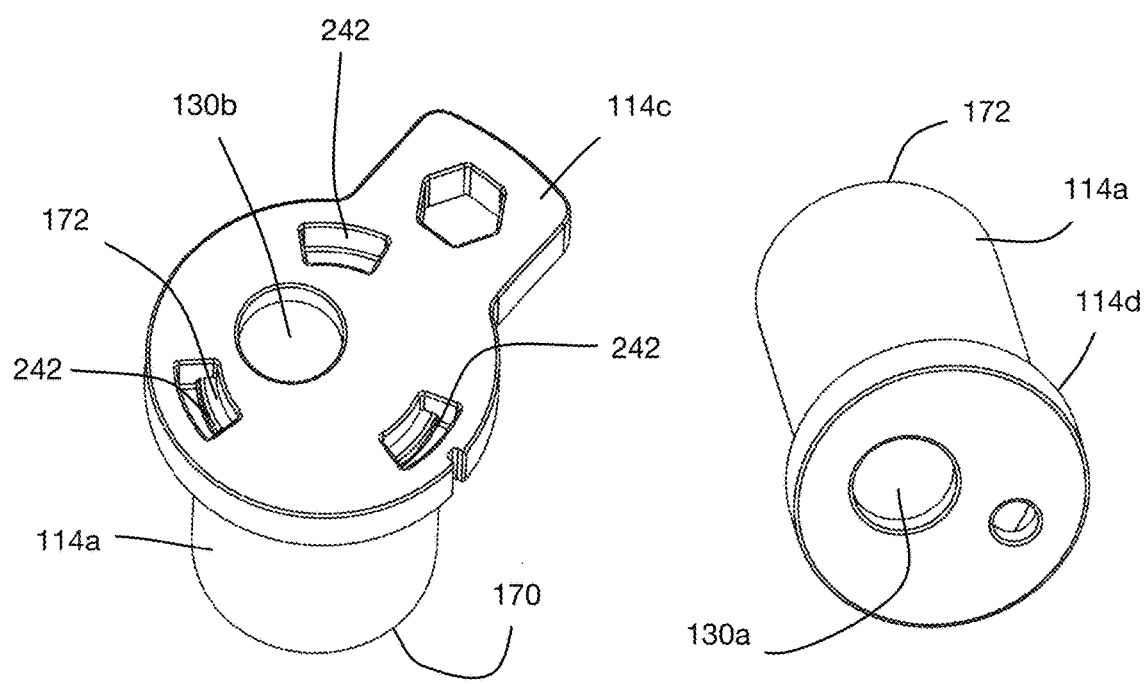
FIG. 17  FIG. 18

TIMING BELT TENSIONER WITH IMPROVED CONSTRUCTION

This application claims the benefit of priority to U.S. Provisional Patent Application No. 62/491,469 filed Apr. 28, 2017, and U.S. Provisional Patent Application No. 62/568,097 filed Oct. 4, 2017, the contents of both of which are incorporated herein in their entirety.

FIELD

This disclosure relates to tensioners and in particular tensioners that operate to tension synchronous endless drive members such as a timing belt on an engine.

BACKGROUND

Tensioners are known devices for maintaining tension in belts (e.g. timing belts) or other endless drive members that are driven by an engine and that are used to drive certain components, such as camshafts. A tensioner typically includes a shaft-and-base unit that mounts to the engine, a tensioner arm that is pivotable with respect to the base about a pivot axis, a pulley that is mounted on the arm for engagement with the belt, and a spring that acts between the base and the arm to drive the arm into the belt. The direction into the belt (i.e. the direction in which the spring drives the arm) may be referred to as a direction towards a free arm position (i.e. towards a position that the tensioner arm would reach if no belt were present to stop it). This is a direction of lessening spring potential energy. The tensioner arm in general moves in this direction as the belt tension drops. The direction away from the belt (i.e. the direction against the biasing force of the spring) may be referred to as a direction towards a load stop position, and is a direction of increasing spring potential energy. The tensioner arm in general moves in this direction as the belt tension increases. It is known that it is desirable to provide damping on a tensioner in order to assist the tensioner arm in resisting being thrown off a belt (e.g. a timing belt) during sudden increases in belt tension which can accelerate the tensioner arm suddenly towards the load stop position. In at least some applications, however, it would be beneficial to provide a tensioner that is improved (e.g. more compact) than some other tensioners.

SUMMARY

In an aspect, a tensioner is provided for an endless drive member. The tensioner includes a shaft-and-base unit that is mountable to be stationary relative to an engine, a tensioner arm, a pulley, a bushing and a tensioner spring. The shaft-and-base unit includes a fastener aperture to permit a fastener to pass through to fixedly connect the shaft-and-base unit to the engine. The tensioner arm is pivotable relative to the shaft-and-base unit about a arm pivot axis. The tensioner arm has a first axial arm end and a second axial arm end. The tensioner arm has a radially outer surface that includes a pulley support surface, and which extends from the first axial arm end to the second axial arm end and is entirely free of any radial projections. The pulley is rotatably supported on the pulley support surface of the tensioner arm for rotation about a pulley axis that is offset from the tensioner arm axis, wherein the pulley is engageable with an endless drive member. The bushing is positioned radially between the shaft-and-base unit and the tensioner arm to support the tensioner arm radially on the shaft-and-base unit. The tensioner spring is positioned to urge the tensioner arm in a first direction about the tensioner arm axis.

In another aspect, a tensioner is provided for an endless drive member, and includes a shaft-and-base unit that is mountable to be stationary relative to an engine, a tensioner arm, a pulley, a bushing and a tensioner spring and a damping carrier. The shaft-and-base unit includes a fastener aperture to permit a fastener to pass through to fixedly connect the shaft-and-base unit to the engine. The tensioner arm is pivotable relative to the shaft-and-base unit about a tensioner arm axis. The pulley is rotatably mounted to the tensioner arm for rotation about a pulley axis that is offset from the tensioner arm axis. The pulley is engageable with an endless drive member. The bushing is positioned radially between the shaft-and-base unit and the tensioner arm to support the tensioner arm radially on the shaft-and-base unit. The tensioner spring is positioned to urge the tensioner arm in a first direction about the tensioner arm axis. The tensioner spring is a torsion spring having a first end and a second end and a plurality of coils between the first and second ends. The first and second ends are pushed by the shaft-and-base unit and the tensioner arm respectively during torque transfer therebetween, so as to urge the coils to expand radially. The damping carrier includes a spring end engagement slot that is positioned to hold the second spring end. The damping carrier further includes a radially inner damping surface thereon. The second spring end and the radially inner damping surface are oriented relative to one another such that a tangential force from the tensioner arm on the tensioner spring at the second spring end results in a reaction force of the shaft-and-base unit on the radially inner damping surface, resulting in frictional damping during movement of the tensioner arm relative to the shaft-and-base unit about the arm pivot axis.

In yet another aspect, a tensioner is provided for an endless drive member, and includes a shaft-and-base unit, a tensioner arm, a pulley and a tensioner spring. The shaft-and-base unit is mountable to be stationary relative to an engine. The shaft-and-base unit includes a fastener aperture to permit a fastener to pass through to fixedly connect the shaft-and-base unit to the engine. The tensioner arm is pivotable relative to the shaft-and-base unit about a tensioner arm axis. The pulley has an endless drive member engagement surface that is engageable with an endless drive member. The pulley is rotatably mounted to the tensioner arm for rotation about a pulley axis that is offset from the tensioner arm axis by an offset distance that is smaller than a radius of the pulley at the endless drive member engagement surface. The tensioner spring is positioned to urge the tensioner arm in a first direction relative to the shaft-and-base unit. The tensioner spring includes a plurality of coils spaced apart from one another by a coil-to-coil gap. A space to enter between any two adjacent ones of the plurality of coils of the tensioner spring is less than a width of each of the plurality of coils so as to inhibit the tensioner spring from entangling with another identical tensioner spring.

In yet another aspect, a tensioner is provided for an endless drive member, and includes a shaft-and-base unit, a tensioner arm, a pulley, and a tensioner spring. The shaft-and-base unit is mountable to be stationary relative to an engine, and includes a fastener aperture to permit a fastener to pass through to fixedly connect the shaft-and-base unit to the engine. The tensioner arm is pivotable relative to the shaft-and-base unit about a tensioner arm axis. The pulley is rotatably mounted to the tensioner arm for rotation about a pulley axis that is offset from the tensioner arm axis. The pulley is engageable with an endless drive member. The tensioner spring is positioned to urge the tensioner arm in a first direction relative to the shaft-and-base unit. The tensioner spring includes a plurality of coils that are arranged generally helically about a longitudinal axis and are spaced radially from one another and generally increase in distance away from the axis in a longitudinal direction.

In yet another aspect, a tensioner is provided for an endless drive member, and includes a shaft-and-base unit, a tensioner arm, a pulley, and a tensioner spring. The shaft-and-base unit is mountable to be stationary relative to an engine, and includes a fastener aperture to permit a fastener to pass through to fixedly connect the shaft-and-base unit to the engine. The shaft-and-base unit includes a base and a shaft that is separate from the base and has the base mounted thereon. The shaft has a shaft axis and has a first axial shaft end and a second axial shaft end. The shaft has a radially outer surface that includes an arm support surface and which extends from the first axial shaft end to the second axial shaft end and is entirely free of any radial projections. The tensioner arm is pivotably supported on the arm support surface of the shaft for pivoting movement about a tensioner arm axis. The pulley is rotatably mounted to the tensioner arm for rotation about a pulley axis that is offset from the tensioner arm axis, wherein the pulley is engageable with an endless drive member. The tensioner spring is positioned to urge the tensioner arm in a first direction relative to the shaft-and-base unit. The tensioner spring has a first end, a second end and a plurality of coils between the first and second ends. The first end is positioned to transfer torque with the base and the second end is positioned to transfer torque with the tensioner arm.

In yet another aspect, a tensioner is provided for an endless drive member, and includes a shaft-and-base unit, a tensioner arm, a pulley, and a tensioner spring. The shaft-and-base unit is mountable to be stationary relative to an engine, and includes a fastener aperture to permit a fastener to pass through to fixedly connect the shaft-and-base unit to the engine. The shaft-and-base unit includes a base and a shaft that is separate from the base and has the base mounted thereon. The shaft has a shaft axis and has a first axial shaft end and a second axial shaft end. The shaft has a radially outer surface that includes an arm support surface and which extends from the first axial shaft end to the second axial shaft end and is entirely free of any radial projections. The tensioner arm is pivotably supported on the arm support surface of the shaft for pivoting movement about a tensioner arm axis. The pulley is rotatably mounted to the tensioner arm for rotation about a pulley axis that is offset from the tensioner arm axis, wherein the pulley is engageable with an endless drive member. The tensioner spring is positioned to urge the tensioner arm in a first direction relative to the shaft-and-base unit. The tensioner spring includes a plurality of coils that are arranged about a longitudinal axis such that the coils are radially offset from one another axially overlap one another. The plurality of coils includes a radially outermost coil and at least one inner coil. One of the tensioner arm and the shaft-and-base unit has a spring limit surface. As tension increases in the endless drive member, the tensioner spring progressively locks up by progressive expansion of the coils into engagement with one another and progressive expansion of the radially outermost coil into engagement with the spring limit surface.

In yet another aspect, a tensioner is provided for an endless drive member, and includes a shaft-and-base unit, a tensioner arm, a pulley, and a tensioner spring. The shaft-and-base unit is mountable to be stationary relative to an engine. The shaft-and-base unit includes a fastener aperture to permit a fastener to pass through to fixedly connect the shaft-and-base unit to the engine. The tensioner arm is pivotable relative to the shaft-and-base unit about a tensioner arm axis. The pulley is rotatably mounted to the tensioner arm for rotation about a pulley axis that is offset from the tensioner arm axis, wherein the pulley is engageable with an endless drive member. The tensioner spring is positioned to urge the tensioner arm in a first direction relative to the shaft-and-base unit. The tensioner spring includes a plurality of coils that are arranged about a longitudinal axis such that the coils are radially offset from one another but axially overlap one another. The plurality of coils includes a radially outermost coil and at least one inner coil. One of the tensioner arm and the shaft-and-base unit has a spring limit surface. When the tension increases in the endless drive member to a selected tension, radial expansion of the plurality of coils is prevented by engagement of the plurality of coils with at least the spring limit surface.

In yet another aspect, a tensioner for an endless drive member. The tensioner includes a shaft-and-base unit, a tensioner arm, a pulley, a tensioner spring and a damping carrier. The shaft-and-base unit is mountable to be stationary relative to an engine block. The tensioner arm is pivotable relative to the shaft-and-base unit about a tensioner arm axis. The pulley is rotatably mounted to the tensioner arm for rotation about a pulley axis that is offset from the tensioner arm axis. The pulley is engageable with an endless drive member. The tensioner spring is positioned to urge the tensioner arm in a first direction about the tensioner arm axis. The tensioner spring is positioned to urge the tensioner arm in a first direction about the tensioner arm axis. The tensioner spring is a torsion spring having a first spring end and a second spring end and a plurality of coils between the first and second spring ends. The shaft-and-base unit is positioned to receive torque from the first spring end and the tensioner arm is positioned to receive torque from the second spring end. The damping carrier includes a spring end engagement slot that holds one of the first and second spring ends. The damping carrier further includes a first damping surface thereon. The first spring end, the second spring end, and the first damping surface are positioned relative to each other such the damping carrier pivots during force transmission between the tensioner arm and the shaft-and-base unit through the tensioner spring so as to drive the first damping surface into a complementary second damping surface on whichever of the tensioner arm and the shaft-and-base unit receives torque from the other of the first and second spring ends.

In yet another aspect, a method of assembling a shaft cover onto a shaft for a tensioner is provided, comprising:
providing a shaft having a cylindrical body, having a first axial shaft end and a second axial shaft end;
providing a shaft cover;
placing the shaft cover on one of the first and second axial shaft ends, wherein the shaft cover has a plurality of staking apertures that expose said one of the first and second axial shaft ends, wherein the shaft cover further includes a staking shoulder that is positioned proximate to, but spaced from said one of the first and second axial shaft ends towards the other of the first and second axial shaft ends;
inserting staking projections into the staking apertures into engagement with the said one of the first and second axial shaft ends; and
deforming said one of the first and second axial shaft ends using the staking projections such that said one of the first and second axial shaft ends projects radially onto the staking shoulder, thereby locking the shaft cover to the shaft.

In yet another aspect, a tensioner is provided for an endless drive member, comprising: a shaft-and-base unit that is mountable to be stationary relative to an engine block; a tensioner arm that is pivotable relative to the shaft-and-base unit about a tensioner arm axis; a pulley that is rotatably mounted to the tensioner arm for rotation about a pulley axis that is offset from the tensioner arm axis, wherein the pulley is engageable with an endless drive member, wherein the pulley has a swept volume; and a tensioner spring that is positioned to urge the tensioner arm in a first direction about the tensioner arm axis, wherein the tensioner spring is a torsion spring having a first spring end and a second spring end and a plurality of coils between the first and second spring ends, wherein the plurality of coils decrease in diameter from one of the first and second spring ends to the other of the first and second spring ends, wherein one of the first and second spring ends is positioned to transfer torque into the shaft-and-base unit and the other of the first and second spring ends is positioned to transfer torque into the tensioner arm, wherein the tensioner spring is positioned substantially entirely within the swept volume of the pulley.

BRIEF DESCRIPTION OF THE DRAWINGS

FIG. 6 is a sectional side view of a spring that may be included in the tensioner shown in FIG. 1;

FIG. 7 is a perspective view of the spring shown in FIG. 6;

FIG. 8 is a spring of the prior art;

FIG. 9A is a perspective view of a shaft from a shaft-and-base unit that is part of the tensioner shown in FIG. 1;

FIG. 9B is a sectional side view of the shaft shown in FIG. 9A;

FIGS. 14-16 are plan views of a tensioner spring that may be used in the tensioner expanding radially during operation under increasing tension in an endless drive member FIG. 17 is a perspective view of a shaft and shaft cover;

FIG. 18 is a perspective view of a shaft and a second cover;

DETAILED DESCRIPTION OF EXAMPLE EMBODIMENTS

Figure 1:
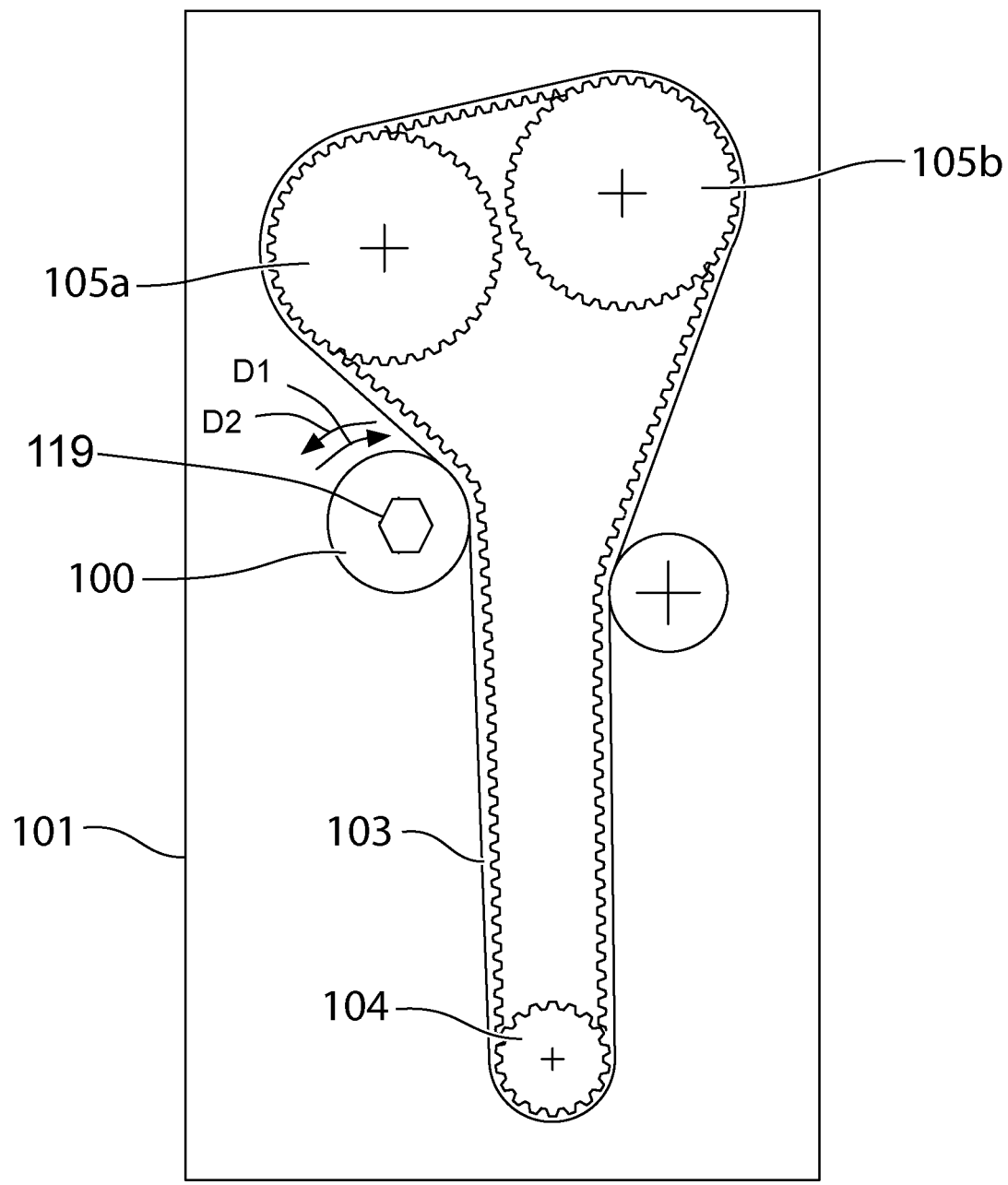
FIG. 1 is an elevation view of an engine, with an endless drive arrangement that incorporates a tensioner in accordance with an embodiment of the present disclosure, incorporating first and second damping members.

A tensioner 100 in accordance with an embodiment of the present disclosure is shown in FIG. 1, and includes one or more features that reduce its overall height as compared to not including any of these features, and that improve its manufacture. The tensioner 100 may be configured to maintain tension in an endless drive member 103 on an engine 101. The endless drive member 103 in the example shown in FIG. 1 is a timing belt, however, the endless drive member 103 may be any other suitable synchronous endless drive member that transfers rotational power from a crankshaft 104 of the engine 101 to one or more driven components such as, for example, a pair of camshafts 105a and 105b. For convenience and readability, the endless drive member 103 may be referred to as the belt 103 or as the timing belt 103, however it will be understood that any suitable endless drive member could be used.

Figure 2:
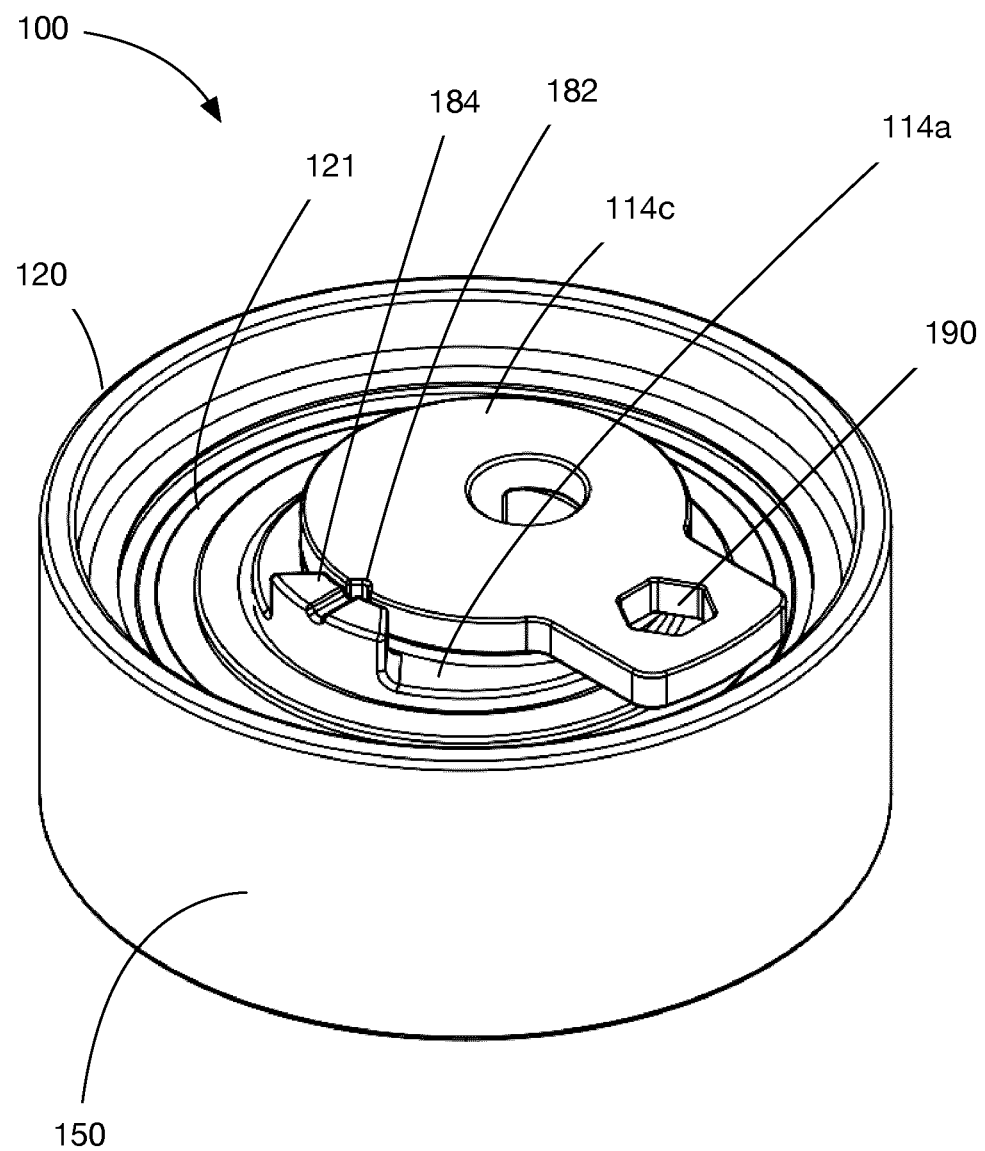
FIG. 2 is a magnified perspective view of the shown in FIG. 1.
Figure 3:
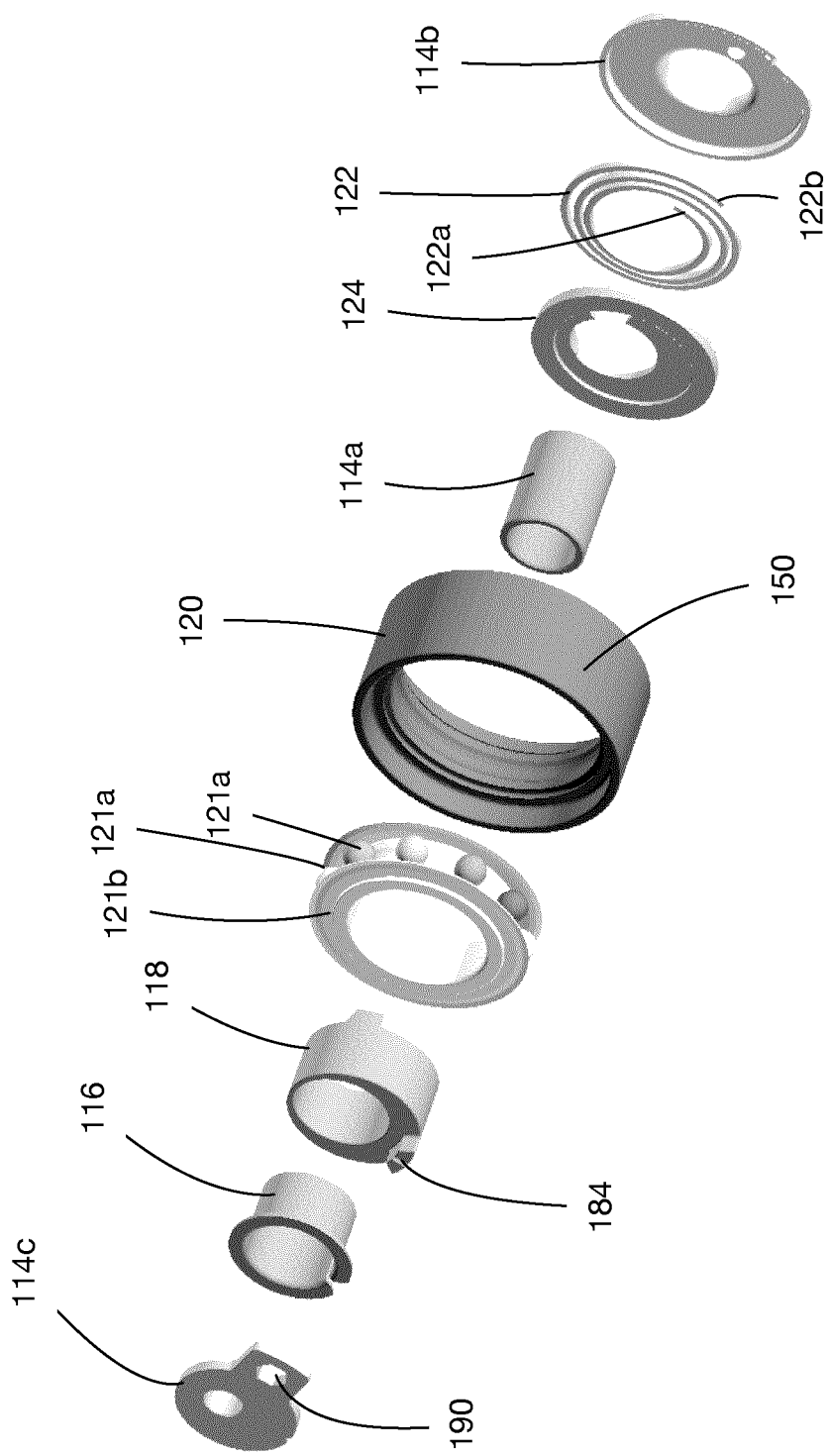
FIGS. 3 and 4 are exploded perspective views of the tensioner shown in FIG. 1.
Figure 4:
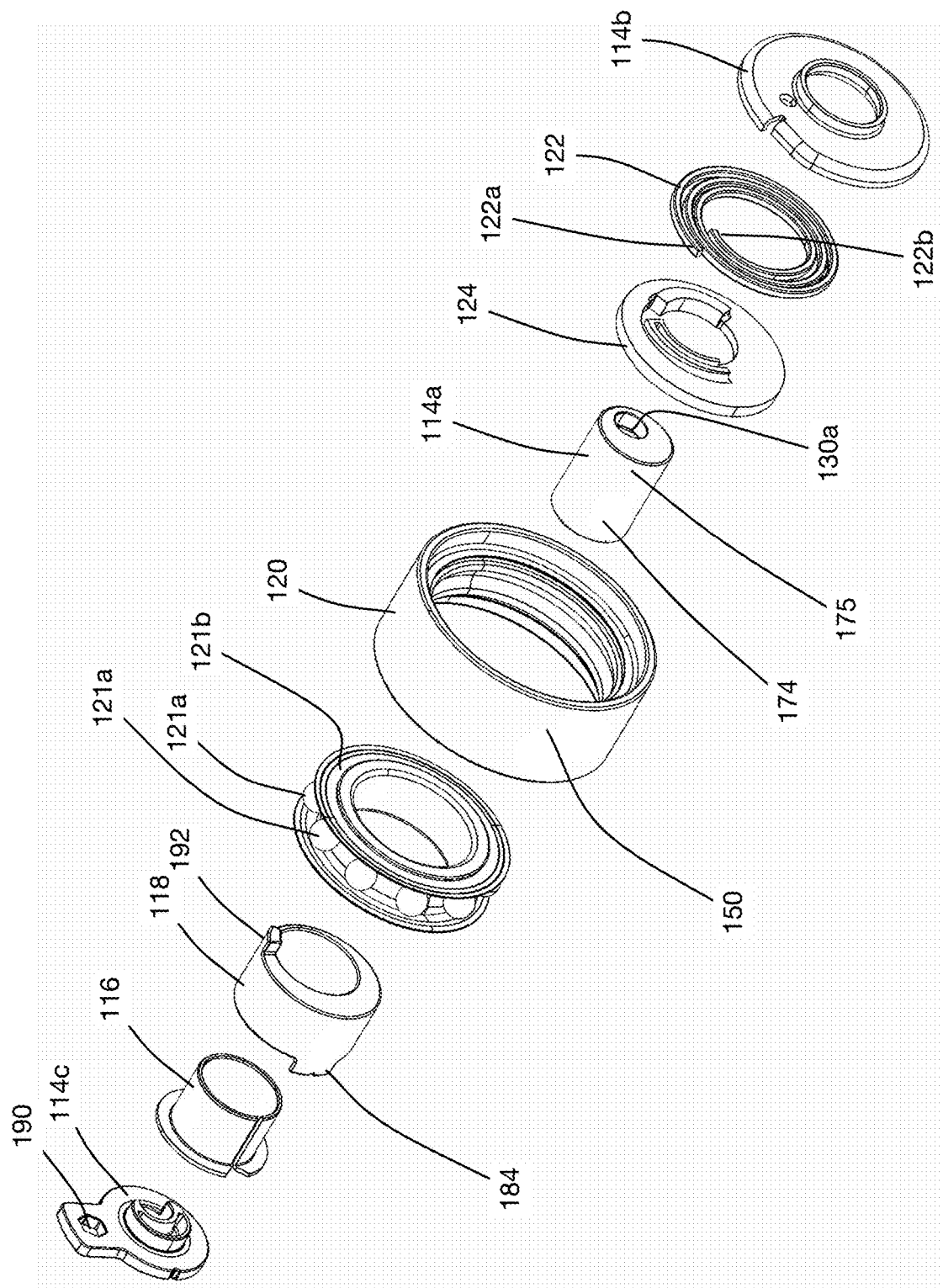
Figure 5:
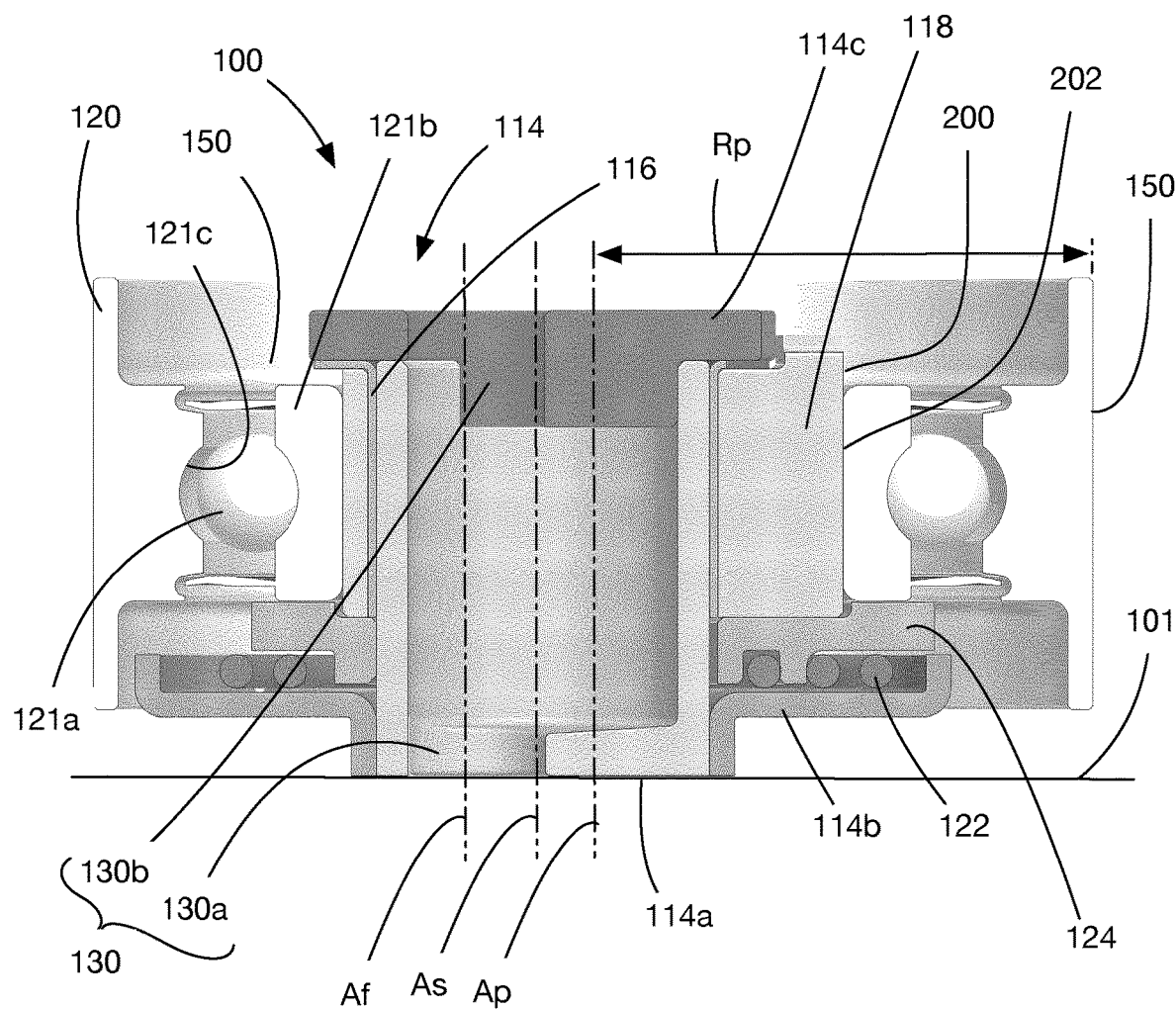
FIG. 5 is a sectional side view of the tensioner shown in FIG. 1.

FIG. 2 is a magnified perspective view of the tensioner 100 itself. FIGS. 3 and 4 are exploded perspective views of the tensioner 100. FIG. 5 is a sectional elevation view of the tensioner 100.

An overview of the components that are included in the tensioner 100 are described below. After the overview is provided, selected features will be described in more detail. With reference to FIGS. 2-5, the tensioner 100 includes a shaft-and-base unit 114, a bushing 116, a tensioner arm 118, a pulley 120 that rotates on the tensioner arm 118, a tensioner spring 122, and a damping carrier 124.

The shaft-and-base unit 114 may include a shaft 114a, a base 114b and a shaft cover 114c that are separate from one another but which are integrally connected by any suitable means, such as, for example, by staking, described further below. The shaft-and-base unit 114 is mountable to be stationary relative to the engine 101 by any suitable means. For example, the shaft-and-base unit 114 may be mountable directly to the engine block as shown in FIG. 1 via a threaded fastener 119, which may be, for example, a bolt that passes through a fastener aperture 130 in the shaft-and-base unit 114 into the block of the engine 101. The fastener aperture 130 may be formed by a proximal fastener aperture portion 130a in the shaft 114a (FIG. 6) and a distal fastener aperture portion 130b in the shaft cover 114c. The shaft 114a (and the shaft-and-base unit 114 as a whole) further includes a central shaft axis As. It can be seen in FIG. 5 that the fastener aperture 130 itself extends along a fastener aperture axis Af that is offset from the central shaft axis As. The offset permits the position of the shaft-and-base unit 114 to be adjusted during mounting of the tensioner 100 on the engine 101 (by pivoting the shaft-and-base unit 114 towards or away from the belt 103, so as to control its proximity to the belt 103).

Shaft has No Radial Projections

Reference is made to FIGS. 9A and 9B, which show the shaft 114a from the shaft-and-base unit 114. In the embodiment shown, the shaft 114a has a first axial shaft end 170 and a second axial shaft end 172 and has a radially outer surface 174 that is entirely free of any projections. In other words, the radially outer surface 174 is free of any shoulders or the like. The radially outer surface 174 includes the arm support surface shown at 175, which is the portion of the radially outer surface 174 that supports the tensioner arm 118. As a result, the surface 174 can be provided with a suitable surface finish for engagement with the bushing 116 via a process where it passes between rollers, as opposed to a shaft-and-base unit of the prior art which has to be set up in a chuck on a machine in order to provide it with a suitable surface finish. The surface finish is helpful in ensuring that the surface 174 is impregnated with a suitable amount of polymer from the bushing so that there is good sliding contact between the surface 174 and the bushing 116.

Figure 10A:
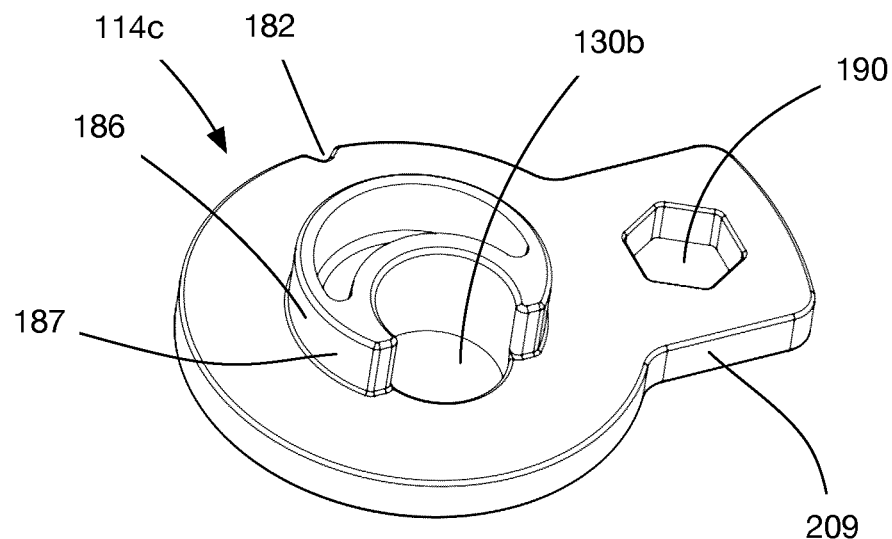
FIG. 10A is a perspective view of a shaft cover from the shaft-and-base unit that is part of the tensioner shown in FIG. 1.
Figure 10B:
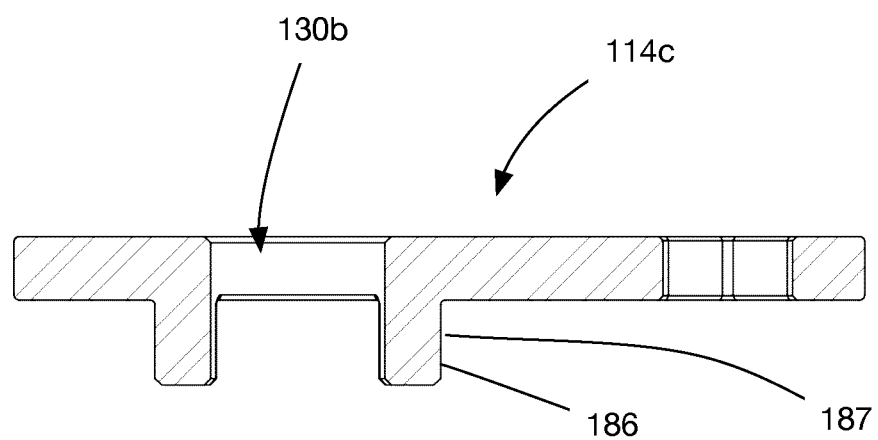
FIG. 10B is a sectional side view of the shaft cover shown in FIG. 10A.

In the embodiment shown, the shaft 114a includes an arm support portion 176 that is cylindrical and which has the arm support surface 175 thereon, and a shaft bottom 178 at the first axial shaft end 170. The shaft bottom 178 has the proximal fastener aperture portion 130a. The shaft 114a is open at the second axial shaft end 172. The shaft cover 114c (shown in FIG. 10) covers the second axial shaft end 172 and includes a flange 180 and the distal fastener aperture portion 130b. The shaft cover 114c is movable on the second axial shaft end 172 to a position in which the distal fastener aperture portion 130b is aligned with the proximal fastener aperture portion 130a to form the fastener aperture 130.

Shaft Cover that Mounts to Inside of Pivot Shaft

The shaft cover 114c includes an axial projection 186 having a radially outer locating surface 187 thereon that engages a radially inner surface 188 of the shaft 114a at the open second axial shaft end 172.

The shaft cover 114c includes a tool receiving region 190 that receives a tool to permit a user to adjust the position of the shaft-and-base unit 114 relative to the engine 101, or in some embodiments that permit a user to adjust the position of the shaft cover 114c relative to the shaft 114a.

The flange 180 axially holds the tensioner arm 118 on the shaft 114a, and may thus be referred to as an arm retaining portion 180. It can be seen that, by having the shaft cover 114c be located using the inner surface 188 of the shaft 114a instead of the outer surface, the overall height of the tensioner 100 can be kept low. By contrast, if the shaft cover 114c was located using the radially outer surface 174 of the shaft 114a, the shaft cover 114c would necessarily have to include a portion that extends axially towards the first axial shaft end 170 in order to have some axial overlap with the radially outer surface 174 of the shaft 114a. This would impinge on the tensioner arm 118 itself if the arm 118 extend as close as it does to the second axial shaft end 172 in the example shown in the figures. Accordingly, to provide some clearance, the shaft 114a would have to be taller, which would increase the overall height of the tensioner. By contrast, by locating the shaft cover 114c on the radially inner surface 188 of the shaft 114a, the flange 180 itself retains the arm 118 and the shaft 114a can be kept shorter.

The tensioner arm 118 is pivotally mounted to the shaft 114a (or more generally, to the shaft-and-base unit 114) for pivotal movement about a arm pivot axis, which is the central shaft axis As. Pivotal movement in a first direction D1 (FIG. 1) may be referred to as movement in a free arm direction. Pivotal movement in a second direction D2 (FIG. 1) may be referred to as movement in a load stop direction.

Arm has No Radial Projections

Figure 11:
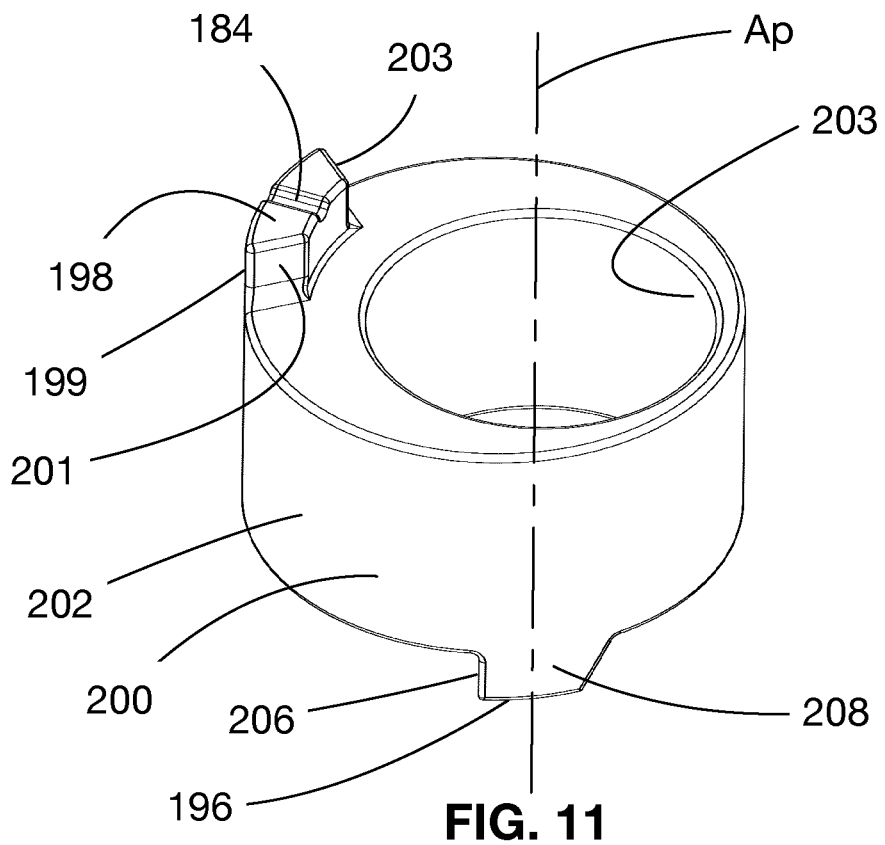
FIG. 11 is a perspective view of a tensioner arm from the tensioner shown in FIG. 1.

Referring to FIG. 11, the tensioner arm 118 has a first axial arm end 196 and a second axial arm end 198, and further includes a radially outer surface 200 that includes a pulley support surface 202, and which extends from the first axial arm end 196 to the second axial arm end 198 and is entirely free of any radial projections. The tensioner arm 118 further includes a radially inner surface 203 that defines an arm pivot axis As.

The second axial arm end 198 is on an axial projection 199 having a first circumferential side 201 that is a free arm stop engagement surface. The shaft cover 114c has a free arm stop 207 thereon. Movement of the tensioner arm 118 in the first direction D1 (FIG. 1) brings the free arm stop engagement surface towards the free arm stop.

The bushing 116 is present between the radially inner surface 203 of the tensioner arm 118 and the arm support surface 175, and facilitates pivoting movement of the tensioner arm 118 on the shaft-and-base unit 114. The bushing 116 may be made from any suitable material such as Stanyl TW371 (which is a material based on Nylon PA46) and which is provided by DSM Engineering Plastics B.V.

The pulley 120 is rotatably mounted to the tensioner arm 118 (e.g. via a bearing 121 or any other suitable means) for rotation about a pulley axis Ap that is offset from the arm pivot axis As by a selected offset distance that smaller than a radius of the pulley 120 at the endless drive member engagement surface 150 (shown at Rp). The pulley 120 has an endless drive member engagement surface 150 that is engageable with the endless drive member 103. The pulley 120 is just one example of an endless drive member engagement member that is mountable to the tensioner arm 118 and is engageable with the endless drive member 103.

The bearing 121 may be provided by a plurality of rolling elements 121a (e.g. balls) and inner and outer races 121b and 121c respectively. The inner race 121b may be a separate element as is commonly provided on bearings, however the outer race 121c may be directly formed in the radially inner surface of the pulley 120. This reduces the number of parts that have to be manufactured.

Staking of Shaft Cover to Shaft without Projections

Reference is made to FIGS. 17, 18, 19A and 19B, which show an alternative embodiment of the shaft 114a. In this alternative embodiment, the shaft 114a is staked to the shaft cover shown at 114c. As can be seen, the shaft 114a has a cylindrical body 240 with no axial projections. The shaft cover 114c has a plurality of staking apertures 242 about the perimeter of the shaft 114a, which expose the second axial shaft end 172. The shaft cover 114c further includes a staking shoulder 244 that is positioned proximate to, but spaced from the second (distal) end 172 towards the first (proximal) end 170. To assemble the shaft cover 114c onto the shaft 114a, the shaft cover 114c is placed on the second (distal) end 172 of the shaft 114a. Staking projections 250 are inserted into the staking apertures 242 into engagement with the second end 172 of the shaft 114a. The staking projections 250 deform the second end 172 such that the second end 172 projects radially outwards onto the staking shoulder 244, thereby locking the shaft cover 114c in place.

In some embodiments, the shaft cover 114c (FIG. 20) has a staking shoulder 254 that is radially inside of the cylindrical body 240 of the shaft 114a, and the staking projections 250 deform the second 172 such that the second end 172 projects radially inwardly onto the staking shoulder 244. Therefore, the staking projections 250 may, more broadly, be said to deform the second end 172 such that the second end 172 projects radially onto the staking shoulder 244.

A bottom cover 114d is shown on the shaft 114a, instead of providing a unitary member that includes the bottom. The bottom cover 114d includes the aperture portion 130a.

Tensioner Spring that Inhibits Entanglement

The tensioner spring 122 is positioned to urge the tensioner arm 118 rotationally to urge the tensioner arm 118 in the first rotational direction (i.e. the free arm direction), thereby driving the pulley 120 into the timing belt 103, while the belt 103 applies a force on the pulley 120 urging the tensioner arm 118 in the load stop direction, against the urging of the spring 122.

As shown in FIGS. 3-5, the tensioner spring 122 may be a helical torsion spring, which has a first end 122a and a second end 122b. The spring 122 may include a plurality of coils 123, wherein a coil is a segment of the spring 122 that extends through 360 degrees. In the present example, with reference to FIG. 8B, the spring 122 has about three coils. The shaft-and-base unit 114 is positioned to receive torque from the first spring end 122a, and the tensioner arm 118 is positioned to receive torque from the second spring end 122b.

During manufacture of a tensioner, it is preferable for such manufacture to be automated (i.e. accomplished by machines, as opposed to assembly workers) in order to reduce the labour to produce the tensioner. However, in tensioners of the prior art, it has been difficult for a machine to be able to grab a tensioner spring from a bin of such springs for insertion into the tensioner, because the springs had a tendency to tangle with one another while in a bin. As a result, an assembly worker was sometimes used to manually grab springs from a bin, untangle them as necessary and subsequently insert them into the tensioner, thereby slowing down production and increasing the cost of production of the tensioner.

With reference to FIG. 6, which shows a sectional view of the tensioner spring 122, in some embodiments, a space to enter between any two adjacent ones of the plurality of coils 123 of the tensioner spring is less than a width of each of the plurality of coils 123, so as to inhibit the tensioner spring from entangling with another identical tensioner spring 122. The space to enter between any two adjacent coils 123 is shown at S. The width of the coils 123 of the spring 122 is shown at Wc. As can be seen, the space S is less than the width Wc. It will be understood that the space S is not the same as the gap between the coils 123. The gap between the coils 123 is the distance between the points on adjacent coils 123 that are closest to one another. For the spring 122 shown in FIG. 6, the gap is shown at G. While it is helpful for the gap G to be less than the width of a coil, there is still a tendency for coils on one spring to wedge a pair of adjacent coils apart on a nearby spring if the springs are pushed towards one another, depending on the shape of the coils. If there is a lot of 'lead-in' to the shape of the coils, the gap G may be small, but the space S may be significantly larger, and this may facilitate the wedging apart of adjacent coils.

Based on the above, it has been found that it is more helpful to inhibit entanglement between springs by forming the springs such that the space S is less than the width Wc of the coils, as is exemplified with the springs 122 (shown individually at 122' and 122") shown in FIG. 6. In FIG. 6, the space S that is identified is the largest space S that exists for the spring 122'. In other words, it is the worst-case scenario. The width Wc that is shown is the width of the coil 123 of the spring 122" that is nearest the space S in the spring 122'. The width of the coils 123 of the springs 122' and 122" may be generally constant, or it may vary along the length of the spring 122.

It will be noted that there are other optional features of the spring 122 that assist in inhibiting entanglement with adjacent springs 122. For example, it can be seen that the spring 122 is made from a wire having a generally rectangular cross-sectional shape. As a result, the size of the space S is relatively closer to the size of the gap G between adjacent coils 123 than it would be for a spring made from wire having a circular cross-sectional shape.

Another optional feature is that the plurality of coils 123 are arranged generally helically about a longitudinal axis (shown at Aspr) and generally increase in distance away from the axis Aspr in a longitudinal direction. In other words, the spring 122 has a generally conical shape. It will be noted that this conical shape itself reduces the likelihood of entanglement as the gap G and space S are generally in the radial direction, and therefore penetration of the gap G or space S is by a vertical force acting on the springs 122' and 122". However, it will be noted that the shape of the coils 123 of the springs 122' and 122" is generally helical (as shown in FIG. 7). Thus, the arcs of the coils 123 inhibit penetration by coils 123 of the adjacent spring which arc in the opposite direction. The same is not true for springs that have a generally cylindrical shape as opposed to the generally conical shape shown in the figures.

Worded another way, the tensioner arm 118 is positioned to move in the second direction D2 that is opposite to the first direction D1 during an increase in tension in the endless drive member 103, and the tensioner spring 122 is positioned to expand radially away from the longitudinal axis Aspr or As in response to movement of the tensioner arm 118 in the second direction D2.

Another optional feature that helps to prevent entanglement between adjacent springs 122 is that, in some embodiments, the tensioner spring 122 is free of tangs, as can be seen in FIG. 7. The spring 122 is what is sometimes referred to as an 'opening' spring, in the sense that its ends 122a and 122b are simply abutted with surfaces of the shaft-and-base unit 114 and of tensioner arm 118 and that flexure of the spring 122 during movement of the tensioner arm 118 in the load stop direction causes the coils 123 of the spring 122 to open up radially. This is in contrast to a closing spring, which is commonly used in some tensioners of the prior art and which requires the ends of the spring to have tangs which hook into corresponding slots in the tensioner arm and shaft-and-base unit, and in which flexure of the spring during movement of the tensioner arm 118 in the load stop direction causes the coils of the spring to constrict radially.

When a spring is formed with tangs, there are natural radii to the bends in the wire of the spring where the tangs begin. An example of such a spring is shown at 160 in FIG. 8. The spring 160 has a plurality of coils 161 and first and second ends on which there are tangs shown at 162. The radii of the bends in the spring wire at the start of the tangs 162 provides a space S that is relatively large and thereby prone to penetration by a coil from an adjacent spring.

All of these aforementioned features of the spring 122 assist in inhibiting entanglement of the spring 122 with adjacent springs 122. As a result, the spring 122 can more easily be picked up from a bin by a machine (e.g. an assembly robot) and inserted into a tensioner, to help automate the assembly of the tensioner. In testing of the spring 122 is was found that had about a 1% entanglement rate, whereas other springs of the prior art have been found to have a rate of entanglement of over 80%.

Damping Carrier

Figure 12:
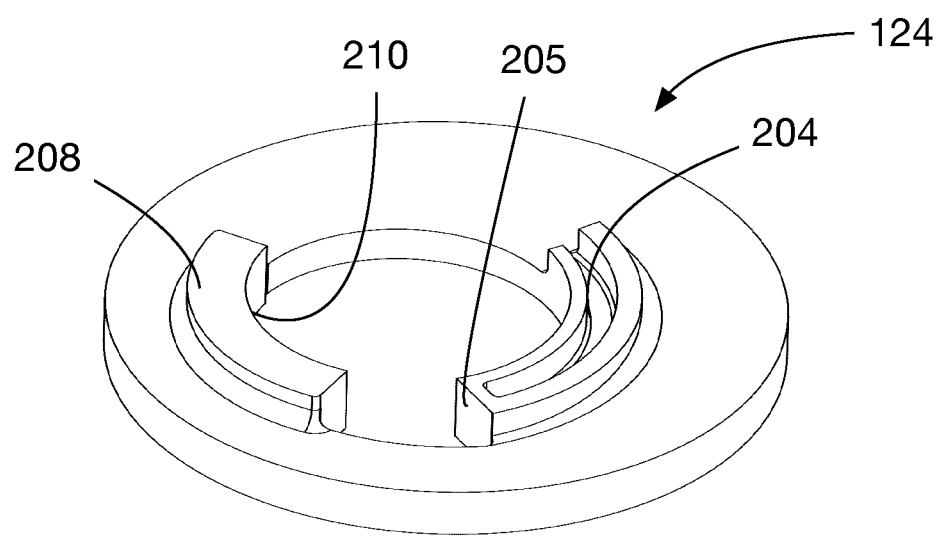
FIG. 12 is a perspective view of a damping carrier from the tensioner shown in FIG. 1.

The damping carrier 124 (FIGS. 12 and 13) holds the tensioner spring 122 and provides some of the damping that is present in the tensioner 100 (while other damping is provided by frictional engagement between the tensioner arm 122 and the bushing 116). In the present example, the damping carrier 124 includes a spring end engagement slot 204 that is positioned to hold the second spring end 122b. As a result, the second spring end 122b transfers torque to the tensioner arm 118 through a wall 205 of the damping carrier 124. The wall 205 engages an arm torque transfer surface 206 (FIG. 13) on the tensioner arm 118. The arm torque transfer surface 206 may be provided on an axial projection 208 on the tensioner arm 118.

In order to provide damping, the damping carrier 124 includes a damping surface 210 thereon. In the example shown, the damping surface 210 is provided on a radially inner surface 211 of the damping carrier 124. In the example shown, the damping surface 210 is provided on an axial projection 212 and has an angular width of about 120 degrees, although other angular widths may be used such as an angular width that is greater than 120 degrees. During torque transfer between the tensioner spring 122 and the tensioner arm 118 (shown in FIG. 13), a force F is applied by the tensioner arm 118 (specifically from the torque transfer surface 206 on the axial projection 208) into the assembly of the spring 122 and the damping carrier 124. The direction of the force F may be generally tangential to the spring 122 at the second spring end 122*b*. The force F results in a certain force that is transmitted from the first spring end 122*a* into the base 114*b*. This force transmitted into the base 114*b* results in a reaction force shown at F3 transmitted from the base 114*b* into the first spring end 122*a*.

Based on the positions and orientations of the forces F and F3 (and therefore the positions of the first and second ends 122*a* and 122*b* of the tensioner spring 122), the damping carrier 124 is caused to pivot about the carrier torque receiving surface shown at 209, which engages with the torque transfer surface 206 on the tensioner arm 118. This pivoting of the damping carrier 124 brings the damping surface 210 into engagement with the portion of the outer surface 174 of the shaft 114*a*, thereby causing damping to occur between the damping carrier 124 and the shaft 114*a*. This portion of the outer surface 174 may be referred to as a damping surface 177. The damping surface 210 may be referred to as a first damping surface 210 and the damping surface 177 may be referred to as a second damping surface, which, in the present embodiment is on the shaft 114*a*.

However, in an alternative embodiment, the first damping surface 210 is provided on a radially outer surface of the damping carrier 124, and the second damping surface 177 is provided on a radially inner surface of the shaft-and-base unit 114 (e.g. as part of a radially inner surface 222 (FIG. 16) of an outer lip 223 of the base 114*b*). In such an alternative embodiment, the damping carrier 124, the tensioner spring 122, and the tensioner arm 118 may be arranged such that the pivoting of the damping carrier 124 drives the radially outer, first damping surface 210 against the radially inner, second damping surface 177, as shown in FIG. 16.

In another alternative embodiment, the damping carrier 124 may be provided at the first end 122*a* of the tensioner spring 122 instead of the second end 122*b*. In such an embodiment, the first damping surface 210 may be provided on either a radially inner or a radially outer surface of the damping carrier 124, while the second damping surface 177 is provided on a complementary surface of the tensioner arm 118.

Based on the above, it may be said that the damping carrier 124 includes a spring end engagement slot (i.e. spring end engagement slot 204) that holds one of the first and second spring ends (122*a*, 122*b*). The damping carrier 124 further includes a first damping surface 210 thereon, wherein the first spring end 122*a*, the second spring end 122*b*, and the first damping surface 210 are positioned relative to each other such that the damping carrier 124 pivots during force transmission between the tensioner arm 118 and the shaft-and-base unit 114 through the tensioner spring 122 so as to drive the first damping surface 210 into a complementary second damping surface 177 on whichever of the tensioner arm 118 and the shaft-and-base unit 114 receives torque from the other of the first and second spring ends 122*a*, 122*b*.

Figure 13:
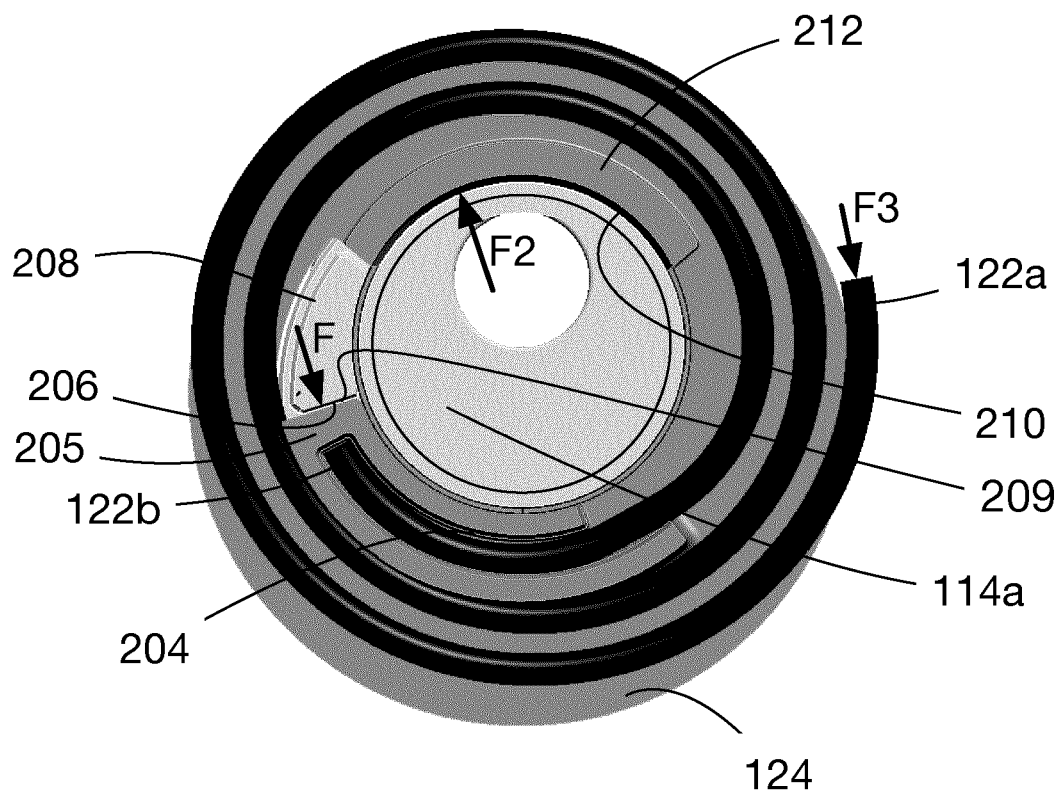
FIG. 13 is a plan view of the damping carrier shown in FIG. 12 and an alternative tensioner spring to the tensioner spring shown in FIG. 6.

As can be seen in FIG. 13, the second spring end 122*b* and the radially inner damping surface are oriented relative to one another such that a tangential force (e.g. the purely tangential force F, or alternatively a tangential force that is a vector component of a non-tangential force) from the tensioner arm 118 on the tensioner spring 122 at the second spring end 122*b* results in a reaction force F2 by the shaft-and-base unit 114 on the radially inner damping surface 210, resulting in frictional damping during movement of the tensioner arm 118 relative to the shaft-and-base unit 114 about the arm pivot axis As. The force F2 shown in FIG. 13 is shown as a point force, however, the actual force F2 is a distributed force distributed over some or all of the angular width of the radially inner damping surface 210. The point force F2 shown in FIG. 13 is a mathematical representation that is the equivalent to that distributed force. A force F3 will be applied on the tensioner spring 122 by a drive surface 212 (FIG. 4) on the shaft-and-base unit 114 (e.g. on an edge surface of a lip 223 on the base 114*b*) which engages the first end 122*a* of the tensioner spring 122. The force F3 (FIG. 13) may be tangential to the tensioner spring 122 at the first end 122*a*.

Progressive Lock Up of Spring

FIGS. 14, 15A, 15B and 16 illustrate another aspect of the operation of the tensioner spring 122. More particularly, it can be seen that the coils 123 of the tensioner spring 122 are arranged about the longitudinal axis Aspr such that the coils 123 are radially offset from one another but axially overlap one another; In other words, the coils 123 of the spring 122 may be considered to have a generally spiral arrangement, even when there is some axial offset from coil 123 to coil 123. As noted above, the plurality of coils 123 includes a radially outermost coil 123*o* and at least one inner coil 123*i*. In the example shown in FIG. 14, there is the outer coil 123*o*, and there are 1.5 inner coils 123*i*. One of the tensioner arm 118 and the shaft-and-base unit 114 has a spring limit surface 222 thereon (e.g. on the lip 223). In the present example, as can be seen in FIG. 5, the spring limit surface 222 is shown as being a radially inner surface of the base 114*b*.

Figure 14:
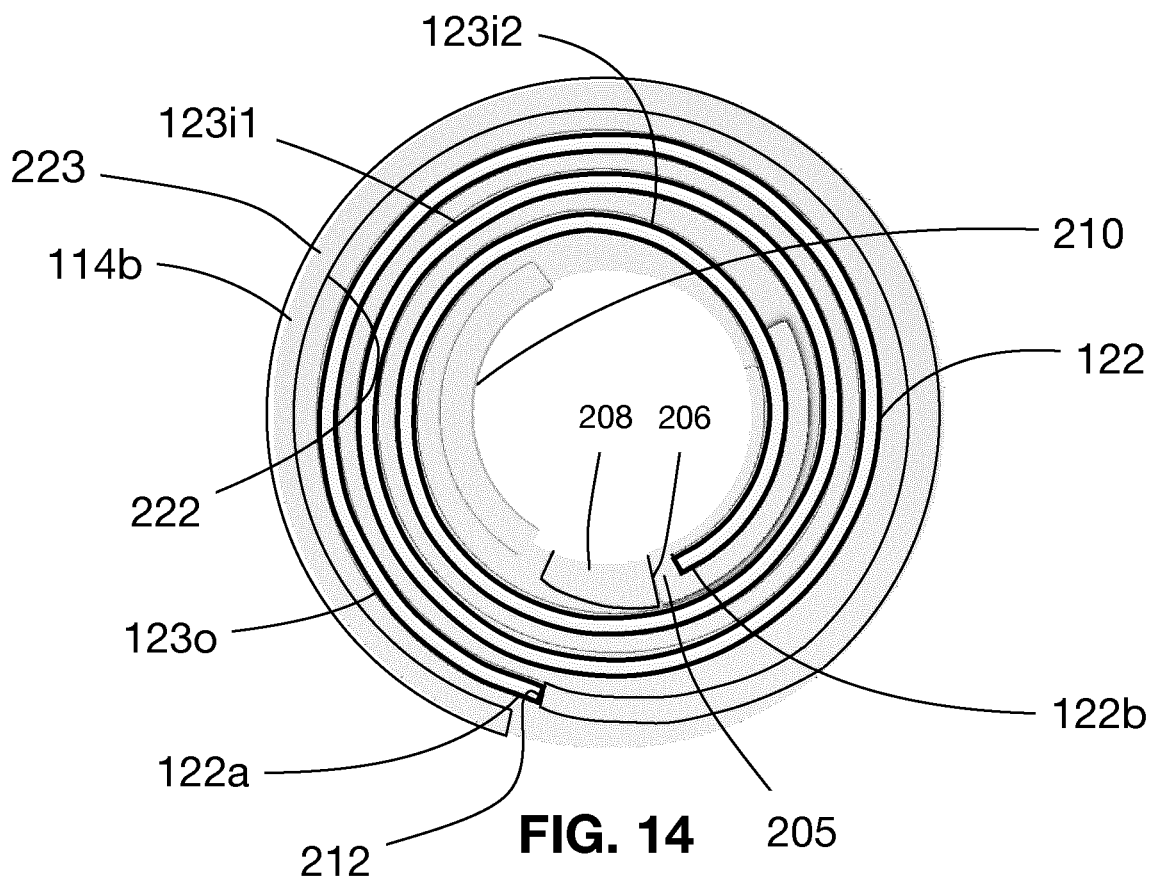

When a relatively low tension is present in the endless drive member 103 (FIG. 1), the coils 123 may be spaced from one another and the outer coils may be spaced from the spring limit surface 222, as can be seen in FIGS. 5 and 14.

Figure 15A:
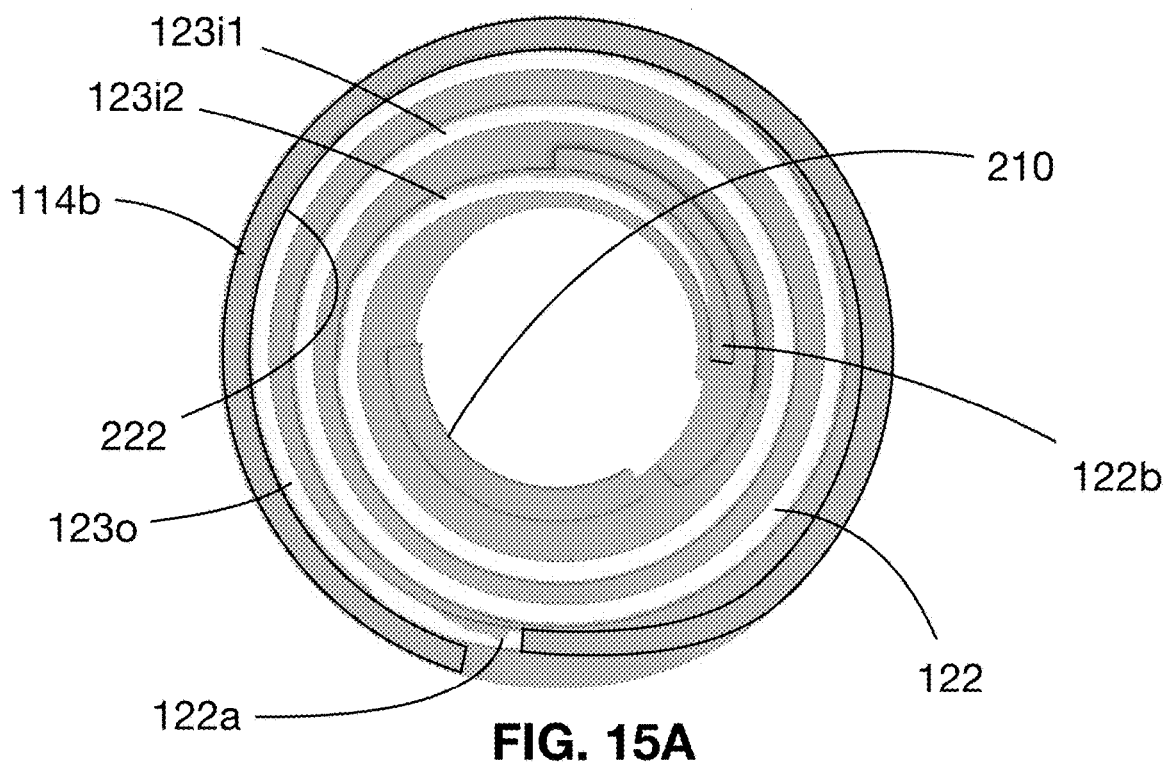
Figure 15B:
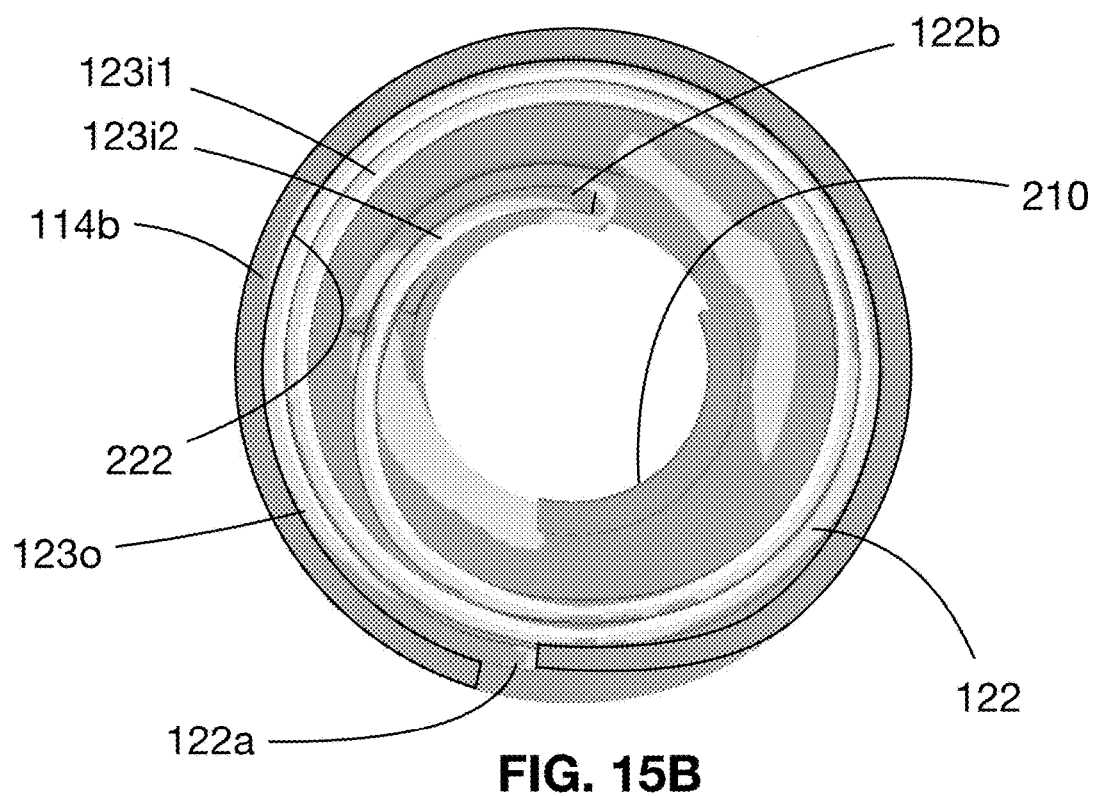

As tension increases in the endless drive member 103 (FIG. 1), the tensioner spring 122 progressively locks up by progressive expansion of the coils 123 into engagement with one another and progressive expansion of the radially outermost coil 123*o* into engagement with the spring limit surface 222. In the embodiment shown, the outermost coil 123*o* expands into engagement with the spring limit surface 222, the next innermost coil (shown at 123*i*1) radially expands into engagement with the outermost coil 123*o*, and the next innermost coil (which is a partial coil shown at 123*i*2) expands radially into engagement with the coil 123*i*1, as shown in FIG. 15B. The position shown in FIG. 15B may be referred to as the load stop position. FIG. 15A shows an intermediate state in which the outermost coil 123*o* expanded into engagement with the spring limit surface 222.

As a result of the progressive engagement of the coils 123 with each other and with the spring limit surface 222, the spring rate of the tensioner spring 122 increases progressively. Once all of the coils 123 are engaged with one another and with the limit surface 222, the spring 122 provides a solid connection between the tensioner arm 118 and the shaft-and-base unit 114 (i.e. the spring 122 has effectively an infinite spring rate). It will be noted that this is an improvement over a tensioner in which the spring is a helical coil spring (i.e. with a generally cylindrical overall shape). If such a tensioner employed a limit surface, the spring would increase its spring rate rapidly as the spring engaged the limit surface until the spring fully engaged the limit surface and provided a solid connection. This rapid increase in spring rate to infinity could potentially result in shock loading and eventually to failure of some components of the tensioner.

Another feature that will be noted in the tensioner 100, is that, in some embodiments, such as the embodiment shown in the figures, the tensioner spring 122 acts as a load stop for the tensioner 100, in the sense that the spring 122 itself acts to limit travel of the tensioner arm 118 in the load stop direction, since, as noted above, once the tensioner arm 118 has traveled sufficiently, all of the coils 123 of the spring 122 are engaged with one another and with the limit surface 222, such that the spring 122 provides a solid connection between the tensioner arm 118 and the shaft-and-base unit 114, which itself is fixedly connected to a stationary structure such as the engine block, during use. Worded another way, when the tension increases in the endless drive member 103 to a selected tension, radial expansion of the plurality of coils 123 is prevented by engagement of the plurality of coils 123 with at least the spring limit surface 222. In the present embodiment, when the tension increases in the endless drive member 103 to the selected tension, radial expansion of the plurality of coils 123 is prevented by engagement of the plurality of coils 123 with each other and with the spring limit surface 222.

While it was disclosed for the spring limit surface 222 to be a radially inner surface of the base 114b, it will be understood that the spring limit surface 222 could alternatively be any other surface such as a radially outer surface of the shaft 114, a radially inner surface of the arm 118 or any other suitable location.

It will be noted that this frictional damping force is proportional to the force (and therefore to the torque) applied by the tensioner arm 118 on the second spring end 122b. This is different than the damping force that is provided by the bushing 116, which is proportional to the radially directed force of the tensioner arm 118 on the bushing 116, which is, in turn, proportional to the hub load on the pulley 120.

The shaft cover 114c additionally has a shaft marker 182 (FIG. 2) thereon, which in the example shown, may be a notch in the flange 180. The tensioner arm 118 has an arm marker 184 thereon at an axial end. The arm marker 184 and the shaft marker 182 cooperate during installation of the tensioner 100 on the engine 101. More specifically, installation of the tensioner 100 may take place as follows:

The tensioner 100 is mounted by passing the fastener 119 through the fastener aperture 130, and into an aperture in a member that is stationary relative to the engine 101, such as the engine block. The fastener 119 is not fully tightened initially. As a result, the shaft-and-base unit 114 can be rotated, while keeping the tensioner arm 122 in a substantially constant position with the pulley 120 engaged with the belt 103 (FIG. 1), so as to adjust the amount of preload there is in the tensioner spring 122 when the engine 101 is off, which in turn adjusts the amount of tension there is in the belt 103 (FIG. 1). The shaft-and-base unit 114 is rotated until the shaft marker 182 is aligned with the arm marker 184. The fastener 119 is then tightened down so as to hold the shaft-and-base unit 114 in that position. Thus, during use, when the engine 101 is off, the arm marker 184 is aligned with the shaft marker 182.

By providing a separate shaft cover 114c, the shaft 114a is able to be made with the surface 174 without any projections. By contrast, shaft-and-base units of the prior art typically have a flange portion that is used to hold down the tensioner arm. However, producing the shaft 114a and shaft cover 114c as separate elements which are connected mechanically via the fastener 119 (which is needed in any case to mount the tensioner 100 to the engine 101) is less expensive than producing a single shaft member that has an integral flange.

Figure 19A:
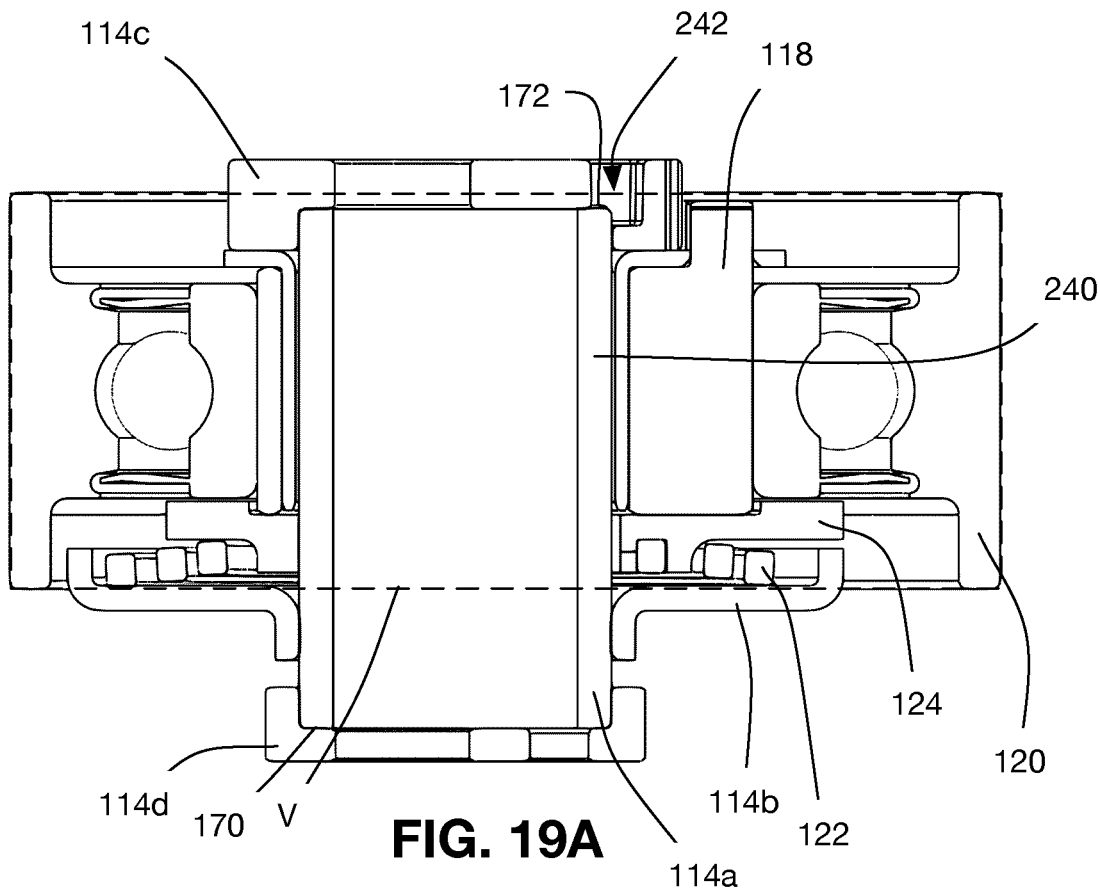
FIGS. 19A-19C illustrate a method of staking the shaft cover shown in FIG. 17 to the shaft shown in FIG. 17.
Figure 19B:
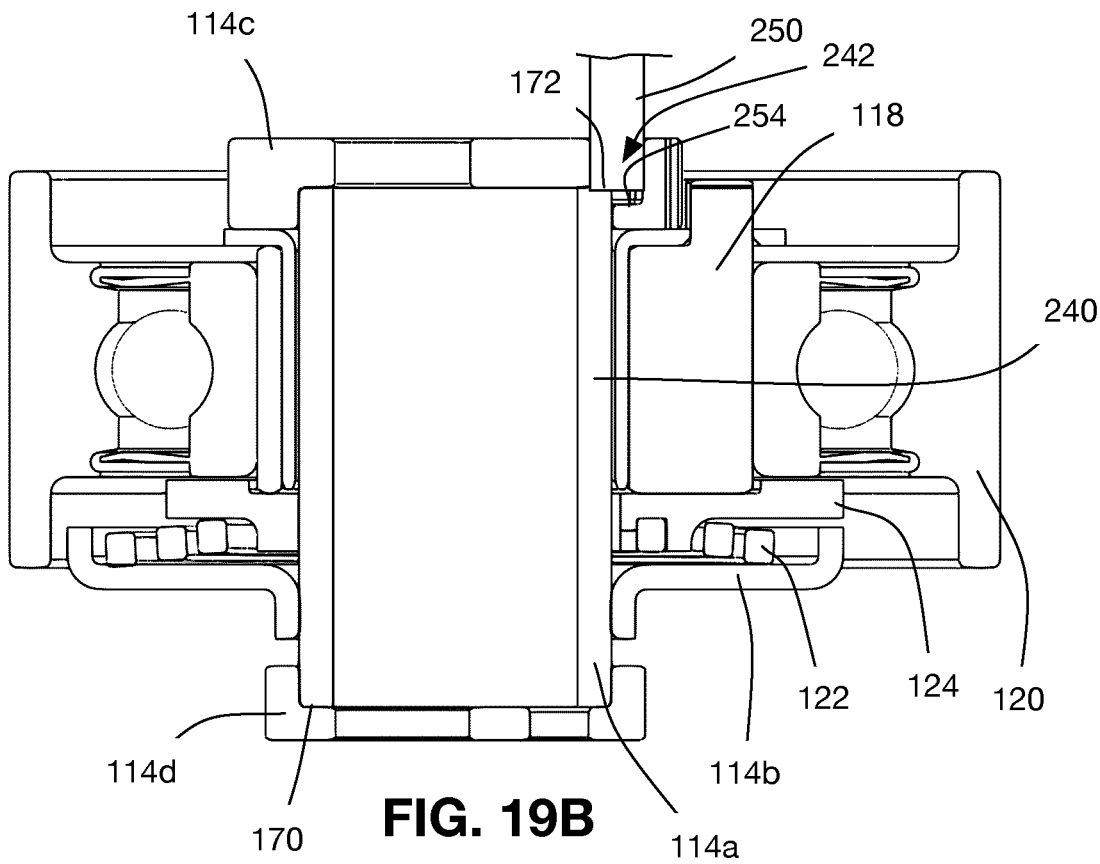
Figure 19C:
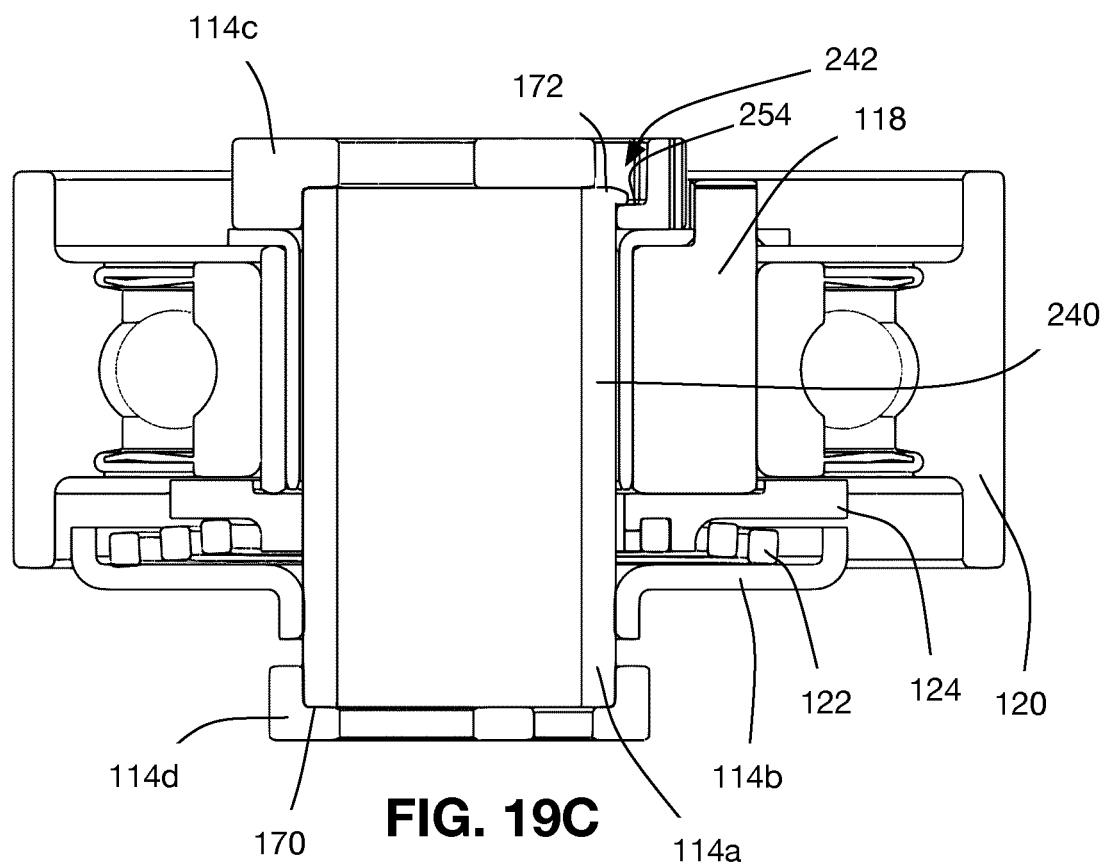

It will be noted that, in some embodiments, the pulley 120 has a swept volume V (i.e. an occupied volume) which is generally shaped as a thick disc, and which is shown in side view in FIG. 19A. In some embodiments, the tensioner spring 122 is positioned substantially entirely within the swept volume V of the pulley 120, as a result of the spring's generally conical shape.

The above-described embodiments are intended to be examples only, and alterations and modifications may be carried out to those embodiments by those of skill in the art.

What is claimed is:

1. A tensioner for an endless drive member, comprising:
a shaft-and-base unit that is mountable to be stationary relative to an engine, wherein the shaft-and-base unit includes a fastener aperture to permit a fastener to pass through to fixedly connect the shaft-and-base unit to the engine, and wherein the shaft-and-base unit includes a base and a shaft that is separate from the base and has the base mounted thereon, wherein the shaft has a shaft axis and has a first axial shaft end and a second axial shaft end, wherein the shaft has a radially outer surface that includes an arm support surface and which extends from the first axial shaft end to the second axial shaft end and is entirely free of any radial projections;
a tensioner arm that is pivotably supported on the arm support surface of the shaft for pivoting movement about a tensioner arm axis;
a pulley that is rotatably mounted to the tensioner arm for rotation about a pulley axis that is offset from the tensioner arm axis, wherein the pulley is engageable with an endless drive member; and
a tensioner spring that is positioned to urge the tensioner arm in a first direction relative to the shaft-and-base unit, wherein the tensioner spring has a first end, a second end and a plurality of coils between the first and second ends, wherein the first end is positioned to transfer torque with the base and the second end is positioned to transfer torque with the tensioner arm,
wherein the shaft includes an arm support portion that is cylindrical and which has the arm support surface thereon, and a shaft bottom at the first axial shaft end, wherein the shaft bottom has a proximal fastener aperture portion, and wherein the shaft is open at the second axial shaft end, wherein the shaft-and-base unit further includes a shaft cover that covers the second axial shaft end and includes an arm retaining portion that axially holds the tensioner arm on the shaft and that includes a distal fastener aperture portion and is movable on the second axial shaft end of the shaft to a position to bring the distal fastener aperture portion into alignment with the proximal fastener aperture portion to form the fastener aperture, wherein the shaft has a radially inner locating surface at the second axial shaft end and wherein the shaft cover has a radially outer locating surface that engages the radially inner locating surface on the shaft to locate the distal fastener aperture portion relative to the proximal fastener aperture portion.

2. A tensioner as claimed in claim 1, wherein the tensioner arm is pivotably supported on the radially outer surface of the shaft via a bushing that is directly supported on the radially outer surface of the shaft.

3. A tensioner as claimed in claim 1, wherein the shaft cover has a free arm stop thereon, and wherein the second axial arm end is on an axial projection having a first circumferential side that is a free arm stop engagement surface, wherein movement of the tensioner arm in the first direction brings the free arm stop engagement surface towards the free arm stop.

4. A tensioner as claimed in claim 3, wherein the tensioner arm has an arm marker thereon at the second axial arm end, and wherein the shaft cover has a shaft marker thereon, wherein, during use, when the engine is off, the arm marker is aligned with the shaft marker.

5. A tensioner as claimed in claim 1, wherein the pulley is a monolithic member that has a radially inner surface that is a first ball engagement surface, and wherein the tensioner further comprises:
an inner race that is press-fit on the pulley support surface and which includes a radially outer surface that is a second ball engagement surface; and
a plurality of balls that rotatably support the pulley on the inner race.

6. A tensioner as claimed in claim 1, further comprising a damping carrier that includes a spring end engagement slot that is positioned to hold the second spring end, wherein the damping carrier further includes a radially inner damping surface thereon, and wherein the second spring end and the radially inner damping surface are positioned such that a tangential force on the second spring end during said torque transfer moves the damping carrier to bring the radially inner damping surface into frictional engagement or increased frictional engagement with the shaft-and-base unit.

7. A tensioner as claimed in claim 1, wherein the plurality of coils are spaced from one another by a coil-to-coil gap, and wherein a space to enter between any two adjacent ones of the plurality of coils of the tensioner spring is less than a width of each of the plurality of coils so as to inhibit the tensioner spring from entangling with another identical tensioner spring.

8. A tensioner as claimed in claim 1, wherein the plurality of coils are arranged generally helically about a longitudinal axis and are spaced radially from one another and generally increase in distance away from the axis in a longitudinal direction.

9. A tensioner for an endless drive member, comprising:
a shaft-and-base unit that is mountable to be stationary relative to an engine, wherein the shaft-and-base unit includes a fastener aperture to permit a fastener to pass through to fixedly connect the shaft-and-base unit to the engine;
a tensioner arm that is pivotable relative to the shaft-and-base unit about an arm pivot axis, wherein the tensioner arm has a first axial arm end and a second axial arm end, wherein the tensioner arm has a radially outer surface that includes a pulley support surface, and which extends from the first axial arm end to the second axial arm end and is entirely free of any radial projections;
a pulley that is rotatably supported on the pulley support surface of the tensioner arm for rotation about a pulley axis that is offset from the tensioner arm axis, wherein the pulley is engageable with an endless drive member;
a bushing that is positioned radially between the shaft-and-base unit and the tensioner arm to support the tensioner arm radially on the shaft-and-base unit; and
a tensioner spring that is positioned to urge the tensioner arm in a first direction about the tensioner arm axis; and
a carrier that is separate from but rotationally connected to the tensioner arm and to the tensioner spring, wherein the carrier extends radially outward beyond the pulley support surface on the tensioner arm, and cooperates with the shaft-and-base unit to at least partially enclose the tensioner spring.

10. A tensioner as claimed in claim 9, wherein the shaft-and-base unit includes a base and a shaft that is separate from the base and has the base mounted thereon, wherein the shaft has a shaft axis and has a first axial shaft end and a second axial shaft end, wherein the shaft has a radially outer surface that includes an arm support surface and which extends from the first axial shaft end to the second axial shaft end and is entirely free of any radial projections,
and wherein the tensioner spring has a first end, a second end and a plurality of coils between the first and second ends, wherein the first end is positioned to transfer torque with the base and the second end is positioned to transfer torque with the tensioner arm.

11. A tensioner as claimed in claim 10, wherein the tensioner arm is pivotably supported on the shaft via bushing that is directly supported on the arm support surface.

12. A tensioner as claimed in claim 10, wherein the shaft includes an arm support portion that is cylindrical and which has the arm support surface thereon, and a shaft bottom at the first axial shaft end, wherein the shaft bottom has a proximal fastener aperture portion, and wherein the shaft is open at the second axial shaft end, wherein the shaft-and-base unit further includes a shaft cover that covers the second axial shaft end and includes an arm retaining portion that axially holds the tensioner arm on the shaft and that includes a distal fastener aperture portion and is movable on the second axial shaft end of the shaft to a position in which the distal fastener aperture portion is aligned with the proximal fastener aperture portion to form the fastener aperture, wherein the shaft has a radially inner locating surface at the second axial shaft end and wherein the shaft cover has a radially outer locating surface that engages the radially inner locating surface on the shaft to locate the distal fastener aperture portion relative to the proximal fastener aperture portion.

13. A tensioner as claimed in claim 12, wherein the shaft cover has a free arm stop thereon, and wherein the second axial arm end is on an axial projection having a first circumferential side that is a free arm stop engagement surface, wherein movement of the tensioner arm in the first direction brings the free arm stop engagement surface towards the free arm stop.

14. A tensioner as claimed in claim 12, wherein the tensioner arm has an arm marker thereon at the second axial arm end, and wherein the shaft cover has a shaft marker thereon, wherein, during use, when the engine is off, the arm marker is aligned with the shaft marker.

15. A tensioner as claimed in claim 9, wherein the pulley is a monolithic member that has a radially inner surface that is a first ball engagement surface, and wherein the tensioner further comprises:
an inner race that is press-fit on the pulley support surface and which includes a radially outer surface that is a second ball engagement surface; and a plurality of balls that rotatably support the pulley on the inner race.

16. A tensioner as claimed in claim 9, wherein the carrier is a damping carrier that includes a spring end engagement slot that is positioned to hold the second spring end, wherein the damping carrier further includes a radially inner damping surface thereon, and wherein the second spring end and the radially inner damping surface are oriented relative to one another such that a tangential force from the tensioner arm on the tensioner spring at the second spring end results in a reaction force of the shaft-and-base unit on the radially inner damping surface, resulting in frictional damping during movement of the tensioner arm relative to the shaft-and-base unit about the arm pivot axis.

17. A tensioner as claimed in claim 9, wherein the plurality of coils are spaced from one another by a coil-to-coil gap, and wherein a space to enter between any two adjacent ones of the plurality of coils of the tensioner spring is less than a width of each of the plurality of coils so as to inhibit the tensioner spring from entangling with another identical tensioner spring.

18. A tensioner as claimed in claim 9, wherein the plurality of coils are arranged generally helically about a longitudinal axis and are spaced radially from one another and generally increase in distance away from the axis in a longitudinal direction.

* * * * *